(12) United States Patent
Juszkiewicz

(10) Patent No.: US 7,249,147 B2
(45) Date of Patent: Jul. 24, 2007

(54) COMBINATION COMPACT DISC RECORDER AND PLAYER SYSTEM

(75) Inventor: Henry E. Juszkiewicz, Nashville, TN (US)

(73) Assignee: Gibson Guitar Corp., Nashville, TN (US)

( * ) Notice: Subject to any disclaimer, the term of this patent is extended or adjusted under 35 U.S.C. 154(b) by 113 days.

(21) Appl. No.: 10/406,821

(22) Filed: Apr. 4, 2003

(65) Prior Publication Data

US 2004/0199534 A1 Oct. 7, 2004

(51) Int. Cl.
*G06F 7/00* (2006.01)
*G06F 17/00* (2006.01)
*G11B 19/00* (2006.01)
*G11B 21/08* (2006.01)
*G11B 21/12* (2006.01)

(52) U.S. Cl. ............... 707/104.1; 707/101; 369/24.01
(58) Field of Classification Search ............... 707/10, 707/104.1; 369/30.06, 47.12, 24.01; 725/89, 725/74; 715/716, 721
See application file for complete search history.

(56) References Cited

U.S. PATENT DOCUMENTS

| | | | |
|---|---|---|---|
| 4,949,187 A | 8/1990 | Cohen | 358/335 |
| 5,041,921 A | 8/1991 | Scheffler | 360/13 |
| 5,140,254 A * | 8/1992 | Katzman | 322/35 |
| 5,191,573 A | 3/1993 | Hair | 369/84 |
| 5,341,350 A | 8/1994 | Frank et al. | 369/30 |
| 5,355,302 A | 10/1994 | Martin | 364/410 |
| 5,410,326 A | 4/1995 | Goldstein | 348/134 |
| 5,450,079 A | 9/1995 | Dunaway | 341/23 |
| 5,481,509 A | 1/1996 | Knowles | 369/30 |
| 5,483,278 A | 1/1996 | Strubbe et al. | 348/7 |
| 5,592,551 A | 1/1997 | Lett et al. | 380/20 |
| 5,608,700 A * | 3/1997 | Ikeda | 369/24.01 |
| 5,625,608 A * | 4/1997 | Grewe et al. | 369/24.01 |
| 5,629,733 A | 5/1997 | Youman et al. | 348/7 |
| 5,633,472 A * | 5/1997 | DeWitt et al. | 84/602 |
| 5,649,013 A | 7/1997 | Stuckey et al. | 380/4 |
| 5,710,605 A | 1/1998 | Nelson | 348/734 |
| 5,722,041 A | 2/1998 | Freadman | 455/6.3 |
| 5,729,279 A * | 3/1998 | Fuller | 725/74 |
| 5,737,030 A | 4/1998 | Hong et al. | 348/564 |
| 5,781,889 A | 7/1998 | Martin et al. | 705/1 |

(Continued)

OTHER PUBLICATIONS

EXHIBIT A—printout regarding BladeEnc MP3 Encoder. (admitted to be prior art).

(Continued)

*Primary Examiner*—Don Wong
*Assistant Examiner*—Cheryl M Shechtman
(74) *Attorney, Agent, or Firm*—Waddey & Patterson, P.C.; Lucian Wayne Beavers; Larry W. Brantley

(57) ABSTRACT

The combination recorder and player system includes a recorder/player unit and a remote control unit. The recorder/player unit includes a recorder/player computer system and recorder/player software that is operable to cause the recorder/player to record, play, and burn CDs. The remote control unit includes a remote control computer system and remote control software that can be used to control the recorder/player unit. The system can be used to automatically copy all of the audio on CDs into memory on the recorder/player, to control multiple pieces of audio and video equipment, and to download and store new music from the Internet.

19 Claims, 12 Drawing Sheets

U.S. PATENT DOCUMENTS

| | | | |
|---|---|---|---|
| 5,802,467 A * | 9/1998 | Salazar et al. | 455/420 |
| 5,848,398 A | 12/1998 | Martin et al. | 705/14 |
| 5,864,868 A | 1/1999 | Contois | 707/104 |
| 5,956,025 A | 9/1999 | Goulden et al. | 345/327 |
| 5,959,945 A | 9/1999 | Kleiman | 369/30 |
| 5,969,283 A | 10/1999 | Looney et al. | 84/609 |
| 6,040,829 A | 3/2000 | Croy et al. | 345/327 |
| 6,041,023 A | 3/2000 | Lakhansingh | 369/7 |
| 6,104,334 A | 8/2000 | Allport | 341/175 |
| 6,107,992 A | 8/2000 | Ishigaki | 345/158 |
| 6,118,450 A | 9/2000 | Proehl et al. | 345/349 |
| 6,130,726 A | 10/2000 | Darbee et al. | 348/734 |
| 6,133,909 A * | 10/2000 | Schein et al. | 715/721 |
| 6,151,059 A | 11/2000 | Schein et al. | 348/13 |
| 6,172,677 B1 | 1/2001 | Stautner et al. | 345/352 |
| 6,182,126 B1 | 1/2001 | Nathan et al. | 709/219 |
| 6,232,539 B1 | 5/2001 | Looney et al. | 84/609 |
| 6,240,550 B1 | 5/2001 | Nathan et al. | 717/11 |
| 6,243,725 B1 | 6/2001 | Hempleman et al. | 707/530 |
| 6,248,946 B1 * | 6/2001 | Dwek | 84/609 |
| 6,255,961 B1 * | 7/2001 | Van Ryzin et al. | 340/825.25 |
| 6,262,722 B1 | 7/2001 | Allison et al. | 345/327 |
| 6,295,555 B1 | 9/2001 | Goldman | 709/219 |
| 6,304,523 B1 | 10/2001 | Jones et al. | 369/30 |
| 6,308,204 B1 | 10/2001 | Nathan et al. | 709/221 |
| 6,313,887 B1 | 11/2001 | Gudorf | 348/734 |
| 6,336,219 B1 | 1/2002 | Nathan | 725/91 |
| 6,346,951 B1 | 2/2002 | Mastronardi | 345/716 |
| 6,353,169 B1 | 3/2002 | Juszkiewicz et al. | 84/600 |
| 6,381,575 B1 | 4/2002 | Martin et al. | 705/1 |
| D457,875 S | 5/2002 | Joe | D14/211 |
| 6,385,596 B1 | 5/2002 | Wiser et al. | 705/51 |
| 6,389,403 B1 | 5/2002 | Dorak, Jr. | 705/52 |
| 6,389,538 B1 | 5/2002 | Gruse et al. | 713/194 |
| 6,393,430 B1 | 5/2002 | Van Ryzin | 707/104 |
| 6,396,523 B1 | 5/2002 | Segal et al. | 345/863 |
| 6,397,189 B1 | 5/2002 | Martin et al. | 705/1 |
| 6,408,332 B1 | 6/2002 | Matsumoto et al. | 709/219 |
| 6,412,110 B1 | 6/2002 | Schein et al. | 725/40 |
| 6,421,067 B1 | 7/2002 | Kamen et al. | 345/719 |
| 6,437,836 B1 | 8/2002 | Huang et al. | 348/734 |
| 6,438,450 B1 | 8/2002 | DiLorenzo | 700/236 |
| 6,446,080 B1 | 9/2002 | Van Ryzin et al. | 707/104 |
| 6,460,076 B1 | 10/2002 | Srinivasan | 709/219 |
| 6,484,011 B1 | 11/2002 | Thompson et al. | 455/3.06 |
| 6,502,194 B1 | 12/2002 | Berman et al. | 713/201 |
| 6,526,577 B1 | 2/2003 | Knudson et al. | 725/40 |
| 6,526,579 B2 | 2/2003 | Sato | 725/58 |
| 6,542,870 B1 | 4/2003 | Matsumoto | 705/1 |
| D475,029 S | 5/2003 | Nathan et al. | D14/126 |
| 6,563,769 B1 | 5/2003 | Van Der Meulen | 369/30.06 |
| 6,567,032 B1 | 5/2003 | Mullaly et al. | 341/176 |
| D475,991 S | 6/2003 | Hisatsune | D14/211 |
| 6,578,051 B1 | 6/2003 | Mastronardi et al. | 707/104.1 |
| D477,591 S | 7/2003 | Hung | D14/218 |
| 6,587,403 B1 | 7/2003 | Keller et al. | 369/30.06 |
| 6,587,404 B1 * | 7/2003 | Keller et al. | 369/30.06 |
| 6,587,837 B1 | 7/2003 | Spagna et al. | 705/26 |
| 6,594,646 B1 | 7/2003 | Okayama et al. | 705/51 |
| 6,598,230 B1 | 7/2003 | Ballhorn | 725/118 |
| 6,614,732 B2 * | 9/2003 | Nonaka et al. | 369/30.18 |
| 6,615,192 B1 * | 9/2003 | Tagawa et al. | 705/57 |
| 6,636,272 B1 | 10/2003 | Noguchi et al. | 348/734 |
| 6,636,867 B2 | 10/2003 | Robertson | 707/104 |
| 6,637,029 B1 | 10/2003 | Maissel et al. | 725/46 |
| 6,647,417 B1 | 11/2003 | Hunter et al. | 709/225 |
| 6,650,963 B2 | 11/2003 | DiLorenzo | 700/234 |
| 6,654,367 B1 * | 11/2003 | Kaufman | 370/356 |
| RE38,353 E | 12/2003 | Peterson | 700/234 |
| 6,662,231 B1 | 12/2003 | Drosset et al. | 709/229 |
| 2001/0013126 A1 | 8/2001 | Lemmons et al. | 725/53 |
| 2001/0014976 A1 | 8/2001 | Roop et al. | 725/91 |
| 2001/0023403 A1 | 9/2001 | Martin et al. | 705/1 |
| 2001/0037304 A1 | 11/2001 | Paiz | 705/52 |
| 2002/0002039 A1 * | 1/2002 | Qureshey et al. | 455/344 |
| 2002/0010788 A1 | 1/2002 | Nathan et al. | 709/231 |
| 2002/0013784 A1 | 1/2002 | Swanson | 707/104.1 |
| 2002/0016968 A1 | 2/2002 | Nathan et al. | 725/86 |
| 2002/0018074 A1 | 2/2002 | Buil et al. | 345/719 |
| 2002/0032019 A1 | 3/2002 | Marks et al. | 455/414 |
| 2002/0035519 A1 | 3/2002 | Takizawa | 705/26 |
| 2002/0047894 A1 | 4/2002 | Steading et al. | 348/44 |
| 2002/0049717 A1 | 4/2002 | Routtenberg et al. | 707/1 |
| 2002/0053084 A1 | 5/2002 | Escobar et al. | 725/47 |
| 2002/0055934 A1 | 5/2002 | Lipscomb et al. | 707/104.1 |
| 2002/0062261 A1 | 5/2002 | Mukai | 705/26 |
| 2002/0083449 A1 | 6/2002 | Im | 725/39 |
| 2002/0085461 A1 * | 7/2002 | Sugiyama | 369/47.12 |
| 2002/0089529 A1 | 7/2002 | Robbin | 345/716 |
| 2002/0091848 A1 | 7/2002 | Agresta et al. | 709/231 |
| 2002/0099660 A1 | 7/2002 | Lee | 705/51 |
| 2002/0111912 A1 | 8/2002 | Hunter et al. | 705/52 |
| 2002/0113824 A1 | 8/2002 | Myers, Jr. | 345/810 |
| 2002/0116082 A1 | 8/2002 | Gudorf | 700/94 |
| 2002/0120577 A1 | 8/2002 | Hans et al. | 705/59 |
| 2002/0120936 A1 | 8/2002 | Del Beccaro et al. | 725/61 |
| 2002/0126141 A1 | 9/2002 | Mastronardi | 345/716 |
| 2002/0140855 A1 | 10/2002 | Hayes et al. | 348/465 |
| 2002/0147728 A1 | 10/2002 | Goodman et al. | 707/104.1 |
| 2002/0152224 A1 | 10/2002 | Roth et al. | 707/104.1 |
| 2002/0154888 A1 | 10/2002 | Allen et al. | 386/46 |
| 2002/0170061 A1 | 11/2002 | DiLorenzo | 725/78 |
| 2002/0184625 A1 | 12/2002 | Allport | 725/39 |
| 2002/0184626 A1 | 12/2002 | Darbee et al. | 725/39 |
| 2002/0188461 A1 | 12/2002 | Matsumoto | 705/1 |
| 2002/0194264 A1 | 12/2002 | Uchiyama et al. | 709/203 |
| 2003/0004833 A1 | 1/2003 | Pollak et al. | 705/26 |
| 2003/0005138 A1 | 1/2003 | Giffin et al. | 709/231 |
| 2003/0014630 A1 | 1/2003 | Spencer et al. | 713/168 |
| 2003/0014753 A1 | 1/2003 | Beach et al. | 725/53 |
| 2003/0023975 A1 | 1/2003 | Schrader et al. | 725/51 |
| 2003/0023976 A1 | 1/2003 | Kamen et al. | 725/53 |
| 2003/0028272 A1 | 2/2003 | Sugiura | 700/94 |
| 2003/0031096 A1 | 2/2003 | Nathan et al. | 369/30.03 |
| 2003/0035074 A1 | 2/2003 | Dubil et al. | 348/734 |
| 2003/0038849 A1 | 2/2003 | Craven et al. | 345/864 |
| 2003/0041325 A1 | 2/2003 | Nathan et al.. | 725/5 |
| 2003/0046243 A1 | 3/2003 | Papsco et al. | 705/52 |
| 2003/0071855 A1 | 4/2003 | Kim | 345/810 |
| 2003/0074421 A1 | 4/2003 | Kusano et al. | 709/219 |
| 2003/0074666 A1 | 4/2003 | Nathan et al. | 725/89 |
| 2003/0079227 A1 | 4/2003 | Knowles et al. | 725/50 |
| 2003/0081511 A1 * | 5/2003 | Dryja | 369/30.06 |
| 2003/0093813 A1 | 5/2003 | Shintani et al. | 725/133 |
| 2003/0101447 A1 | 5/2003 | Nathan et al. | 725/5 |
| 2003/0110126 A1 | 6/2003 | Dunkeld et al. | 705/39 |
| 2003/0110132 A1 | 6/2003 | Sako | 705/51 |
| 2003/0115603 A1 | 6/2003 | Lemmons et al. | 725/53 |
| 2003/0132952 A1 | 7/2003 | Davis et al. | 345/716 |
| 2003/0135424 A1 | 7/2003 | Davis et al. | 705/26 |
| 2003/0135857 A1 | 7/2003 | Pendakur et al. | 725/61 |
| 2003/0140341 A1 | 7/2003 | Nakashima | 725/44 |
| 2003/0149978 A1 | 8/2003 | Plotnick | 725/39 |
| 2003/0149980 A1 | 8/2003 | Hassell et al. | 725/39 |
| 2003/0149988 A1 | 8/2003 | Ellis et al. | 725/87 |
| 2003/0159144 A1 | 8/2003 | Kitagawa et al. | 725/44 |
| 2003/0163211 A1 | 8/2003 | Van Der Meulen | 700/94 |
| 2003/0163486 A1 | 8/2003 | Van Der Meulen | 707/104.1 |
| 2003/0163823 A1 * | 8/2003 | Logan et al. | 725/89 |
| 2003/0196204 A1 | 10/2003 | Thiagarajan et al. | 725/61 |
| 2003/0208586 A1 | 11/2003 | Mastronardi et al. | 709/223 |
| 2003/0208760 A1 | 11/2003 | Sugai et al. | 725/50 |
| 2003/0229797 A1 | 12/2003 | Newman | 713/193 |
| 2004/0001395 A1 | 1/2004 | Keller et al. | 369/30.09 |

| | | | |
|---|---|---|---|
| 2004/0001396 A1 | 1/2004 | Keller at al. | 369/30.09 |
| 2004/0008287 A1 | 1/2004 | Johnston et al. | 348/734 |
| 2004/0010800 A1 | 1/2004 | Goci | 725/78 |
| 2004/0019497 A1 | 1/2004 | Volk et al. | 705/1 |
| 2004/0025179 A1 | 2/2004 | Russ et al. | 725/46 |
| 2004/0025185 A1 | 2/2004 | Goci et al. | 725/92 |
| 2006/0153020 A1* | 7/2006 | Johnson et al. | 369/30.06 |

OTHER PUBLICATIONS

EXHIBIT B—TDK Electronics materials re DA-3826, DA-5900 and DA-9000. (admitted to be prior art).
EXHIBIT C—Dell Axim X5 Handheld material. (admitted to be prior art).
EXHIBIT D—The JJukebox Project. (not admitted to be prior art).
EXHIBIT E—Perception Digital PDHercules Digital Recordable Jukebox II. (not admitted to be prior art).
EXHIBIT F—Build a Digital Jukebox with Windows Media Player 9 Series. (not admitted to be prior art).
EXHIBIT G—The GIDI Digital Jukebox offers 80GB of MP3. (not admitted to be prior art).
EXHIBIT H—The Digital Jukebox by MP Sharp Technologies. (not admitted to be prior art).
EXHIBIT I—Digital Jukebox. (not admitted to be prior art).
EXHIBIT J—MUSICMATCH Jukebox 7.5. (not admitted to be prior art).
EXHIBIT K—Best Free Digital Jukebox Software. (not admitted to be prior art).
EXHIBIT L—CER Common Era Records Digital Jukebox. (not admitted to be prior art).
EXHIBIT M—TerraTec's Digital Jukebox c.a.r. 4000: MP3 functionality to your HiFi rack. (not admitted to be prior art).
EXHIBIT N—Herrington Home: Audio/Video: Digital Jukebox. (not admitted to be prior art).
EXHIBIT O—Digital jukebox coming to the Visor. (not admitted to be prior art).
EXHIBIT P—MacDaniel's Advice Make Your Own Digital Jukebox. (not admitted to be prior art).
EXHIBIT Q—HP's de100c: A digital jukebox that works. No, really! (not admitted to be prior art).
EXHIBIT R—Crain's Chicago Business, Aug. 14, 2000, "Ju kebox maker gives the Internet a spin". (admitted to be prior art).
Co-pending U.S. Appl. No. 10/407,811, filed Apr. 4, 2003. (not admitted to be prior art).
Co-pending U.S. Appl. No. 10/407,811, filed Apr. 4, 2003, by Henry E. Juszkiewicz.

* cited by examiner

COMBINATION COMPACT DISC RECORDER AND PLAYER SYSTEM

BACKGROUND OF THE INVENTION

The present invention relates generally to compact disc (CD) recorders and players. More particularly, the present invention pertains to a combination CD recorder and player system.

Many consumers have music collections that include a number of CDs. While CDs have many benefits that are well known in the art, large collections of CDs have several disadvantages. First, it can be time consuming to locate a particular CD in a large CD collection. In many cases, a consumer must look through the entire collection in order to locate the desired CD. The larger the collection, the more time-consuming this process can be. While organizing the CDs in alphabetical order can minimize the amount of time required to locate a particular CD, many consumers do not do so. Moreover, the process of organizing and maintaining large CD collections in alphabetical order can be time-consuming. Thus, there is a need for a system that reduces the amount of time required to locate a CD in a large CD collection.

Similarly, it can be time-consuming to locate a specific song on a particular CD in a large CD collection. In addition to the time it takes to locate the CD containing the desired song, a consumer must search through the songs on the CD to locate the desired song. In many cases, the consumer must review the face of the CD, or the CD case associated with the CD, to locate the number of the desired song, and then must input that number into the CD player being used to play the CD. To input the correct number, the consumer usually must skip though several songs to reach the desired song. When using CD players that hold multiple CDs, the consumer may also be required to skip through multiple CDs in order to reach the CD that includes the desired song. Regardless of whether a consumer is using a CD player that can hold a single CD or multiple CDs, the process of locating a specific song on a CD can be time-consuming. Thus, there is a need for a system that reduces the amount of time required to access a particular song in a large CD collection.

Large CD music collections are also difficult to access in multiple locations. To do so, a consumer must physically move the collection from one location to another. This can be a time-consuming and inconvenient process. The larger the collection, the more time-consuming and inconvenient it can be. Furthermore, in some cases, it is simply not practical to move a large CD collection to a particular location. For example, it is usually not very practical to move a large CD collection into a small automobile. Many consumers, however, would like to be able to access their music collections in their automobiles, as well as in other locations. Thus, there is a need for a system that allows a consumer to access a large CD music collection in multiple locations.

In addition to being time-consuming to locate and play, CDs have other disadvantages. For example, to play a CD that is stored in a CD case, a consumer must remove the CD from the case and insert it into a CD player. When the consumer does so, the consumer may touch the surface of the CD and leave oil or dirt on it. If this happens, the CD may skip in the player or, in some cases, may not play at all. Thus, there is a need for a system that reduces or eliminates the risk that a consumer will put oil or dirt on a CD and prevent it from playing properly.

CDs also usually include songs that a consumer likes to listen to and songs that they do not like to listen to. In many cases, the songs that the consumer enjoys are intermingled with the songs that the consumer does not enjoy. As a result, the consumer must either listen to the songs that they do not enjoy or skip over those songs to reach a song that the consumer enjoys. In either case, this can be inconvenient for the consumer. Thus, there is a need for a system that allows a consumer to listen to songs they enjoy without having to listen to or skip over songs that they do not enjoy.

In other cases, the songs that the consumer enjoys are located on multiple, different CDs and the consumer must carry all of those CDs with them when they travel to different locations if they want to listen to the songs that they enjoy. This too can be inconvenient for a consumer. Thus, there is a need for system that allows a consumer to listen to songs that they enjoy, located on a variety of different CDs, without requiring the consumer to carry the different CDs with them.

In addition to the disadvantages associated with CD players discussed above, prior art CD players usually include a black or silver enclosure that is not aesthetically appealing to many consumers. Thus, there is an additional need for a CD player system that is more aesthetically appealing to consumers and that overcomes the disadvantages discussed above.

Prior art CD players also usually include remote control devices that can be used to control the various functions associated with the CD players. While the remote controls may make it more convenient to control these CD players, they increase the number of remote control devices in a home and make it more difficult to locate the correct remote for a given piece of electronic equipment. For example, many people have a remote control for their TV, VCR, DVD Player, and stereo system. By including another remote with a prior art CD player, the number of remote control devices in a home is increased. As a result, it is more difficult to locate the correct remote for the TV, VCR, or DVD player. Thus, there is a need for a system that overcomes the above-referenced disadvantages and that does not increase, and preferably decreases, the number of remote controls in a given home.

Obtaining new music on CDs can be a time-consuming and inconvenient process for a consumer. In many cases, a consumer drives to a store, reviews the available CDs, selects one or more CDs, and purchases the selected CDs. The consumer then returns home to listen to the selected CDs. This can be time-consuming and inconvenient for the consumer, particularly, when the consumer lives a great distance from the store selling the CDs. Thus, there is a need for a system that reduces the amount of time required and makes it more convenient for a consumer to purchase new music.

What is needed, then, is a system that overcomes the above-referenced disadvantages of the prior art.

SUMMARY OF THE INVENTION

Accordingly, one object of the present invention is to provide a system that reduces the amount of time required to locate a CD in a large CD collection.

Another object is to provide a system that reduces the amount of time required to locate a specific song on a particular CD.

A third object of the present invention is to provide a system that allows a consumer to more easily access a large CD collection from multiple locations.

A fourth object is to provide a system that reduces or eliminates the possibility that a consumer will get oil or dirt on a CD.

Still another object of the present invention is to provide a system that allows a consumer to listen to songs that they enjoy without having to listen to or skip over songs that they do not enjoy.

A sixth object is to provide a system that allows a consumer to listen to songs that they enjoy, located on multiple, different, CDs, without requiring the consumer to carry the different CDs with them.

A seventh object of the present invention is to provide a system that includes a more aesthetically appealing enclosure and that overcomes the above-referenced disadvantages associated with prior art CD players and CDs.

Yet another object is to provide a system that reduces the number of remote control devices in a home.

A ninth object of the present invention is to provide a system that reduces the amount of time and makes it more convenient for a customer to purchase or listen to new music.

These objects, and other objects that will become apparent from a review of the following description, are satisfied by the present invention of a combination CD recorder and player system. The system is a client/server computer system and includes a combination recorder and player unit, which acts as a server computer system, or host computer, and a remote control unit, which acts as a client computer system. The remote control unit is also referred to as a remote control system for the host computer or simply a client system. The recorder/player unit includes novel server computer software, referred to as the recorder/player software, and the remote control unit includes novel client software, or remote control software.

To reduce the amount of time required to locate a CD or a song on a particular CD, the system allows a consumer to copy all of their CDs onto the system by pressing a single button and provides a novel user interface that allows the consumer to quickly and easily locate and play a particular CD or a specific song. By copying the CDs onto the system, the consumer is also able to reduce the number of times that they must handle their CDs and, as a result, reduce the possibility that their CDs will be contaminated with oil or dirt. In addition, once the CDs are copied onto the system, they can be replaced in their protective CD cases and stored away for future use. This further reduces the possibility that the CDs will become contaminated with oil or dirt.

To allow a consumer to access their CD collection in multiple locations, the system allows the consumer to create, or "burn," new CDs that include songs of their choosing. Once a new CD is created, the consumer can carry the new CD to various different locations. The ability to burn CDs that include songs that the consumer selects also provides the consumer with the ability to create CDs that only include songs that the consumer likes to listen to. This allows the consumer to avoid listening to or having to skip over songs that they do not like. In addition, this also prevents the consumer from having to carry multiple CDs with them in order to listen to songs that are included on different CDs. Using the system of the present invention, the consumer can simply burn a new CD that includes all of the desired songs and carry that new CD instead.

To further enhance the consumer's ability to access their CD collection in multiple locations, the system also can be used to record CDs on the remote control unit, which can then be carried by the consumer to different locations and used to play the recorded CDs. The system displays complete information regarding the CDs stored on the remote control unit, including the title of a CD, the name of an artist, and the title of a particular song.

If the consumer would like to listen to their CDs and they are within a certain range of the system of the present invention, the system can also be used to transmit, wirelessly or by other conventional means, and play music on the client system without permanently storing music on the client system, i.e., streaming audio.

To enhance the appearance of the combination recorder and player unit, the housing is designed to look like a traditional jukebox and includes animated bubble tubes, revolving color columns, and a revealed CD changing mechanism, which can be used to play a CD in a conventional manner.

To reduce the number of remote controls in the home, the remote control unit can be used to control a variety of other audio and video components. To do so, the system includes memory that stores information necessary to control audio and video components that are found in the typical home and the system uses this information to control these devices. The system can be used to stored information that enables the client system to control different components in different rooms. In addition, the client system can communicate with other remotes and learn the information necessary to control other devices. To facilitate programming, the client system can be connected to a conventional computer and a novel programming module can be used to program the client system so that it can communicate with various other audio and video components. The programming module can also be used to trade graphics and remote control features with other consumers using the client system of the present invention. To further enhance convenience for the consumer, the system can be used to control lights, appliances, and other devices in the home using X-10 technology, which is a type of control system that uses a home's power supply wiring to communicate with devices in the home.

To reduce the amount of time required to listen to and purchase new music, the system is operable to communicate and download new songs using the Internet. Various artists and record companies allow consumers to access songs and other material created by emerging artists absolutely free of charge on the Internet and the system of the present invention allows a consumer to take advantage of these opportunities.

To further enhance the ability of a user to listen to and purchase new music, the present invention includes a novel music server computer system that can be used by the combination recorder and player units of the present invention to listen to and download new music. The novel server includes a database for storing music and a streaming audio server program that can be used to simultaneously stream the stored music to multiple combination recorder and player units during broadcasts over the Internet. In exchange for a subscription fee, users may listen to the broadcasts and, when they hear a song that they like, they can download that song to their combination recorder and player unit. The subscription fee also provides the consumer with access to program guides containing detailed information regarding music broadcasts and a TV program guide covering local broadcasts of cable, satellite, or local stations, and including full program descriptions and reviews.

To ensure that the recording artists of the music stored on the music server receive the appropriate copyright royalty when music is downloaded to combination recorder and player units, each unit is operable to monitor and store information regarding the number of times a song has been downloaded from the music server, burned to a CD, or copied to an associated remote control unit. In addition, each unit is operable, at predetermined times, to automatically transmit this information to the music server computer, where it can be used to calculate the appropriate royalties for the recording artists. These royalties can then be paid using the subscription fees paid by the various users of the combination recorder and player units.

To ensure that music on the music server is not downloaded by users who have not paid the appropriate subscription fee and devices other than the combination recorder and player units of the present invention, the database on the music server also stores a list of unique identification numbers and ownership information for all combination recorder and player units that are authorized to listen to and download music from the music server. Other devices, such as conventional personal computers, that do not include one of the unique identification numbers cannot access the music server and listen to or download music from the music server.

To further enhance security with regard to improper copying of music downloaded onto the combination recorder and player units, the music server attaches a unique identification number to each song downloaded to those units. Each unit, in turn, includes its unique identification number with each song that is burned on a CD or transmitted to a remote control unit. As a result, if a song is improperly distributed over the Internet, via a burned CD or other any other means, the music server of the present invention can be used to identify the combination recorder and player unit that originally received the song. This is done by simply comparing the unique identification number of the song in question with the list of unique identification numbers stored on the music server and using the owner information associated with the matching unique identification number to identify the owner of the combination recorder and player unit that received the song.

To prevent music downloaded from the music server and burned onto a CD from being copied onto a personal computer, each combination recorder and player unit is operable to burn CDs using any one of the various personal computer copy prevention technologies known in the art. For example, CDs may be burned so that the audio on the CD are hidden from CD-ROM drives typically found on a personal computer or, alternatively, CDs may be burned so that the audio includes errors that cause clicks and pops to appear in any copies of the burned CD. As a result, personal computers cannot copy CDs burned by the combination recorder and player units of the present invention.

To reduce the possibility that the present invention will eliminate a consumer's desire to continue to purchase CDs from a conventional brick and mortar store, the streaming audio provided by the music server may be supplied in a compressed audio format, such as $MP^3$, that is inferior to the quality of a digital audio recording on a CD. Thus, while users can easily listen to and download new music using the present system, they will still need to purchase CDs from conventional stores in order to obtain very high quality music recordings.

DESCRIPTION OF THE PREFERRED EMBODIMENT

Figure 1:
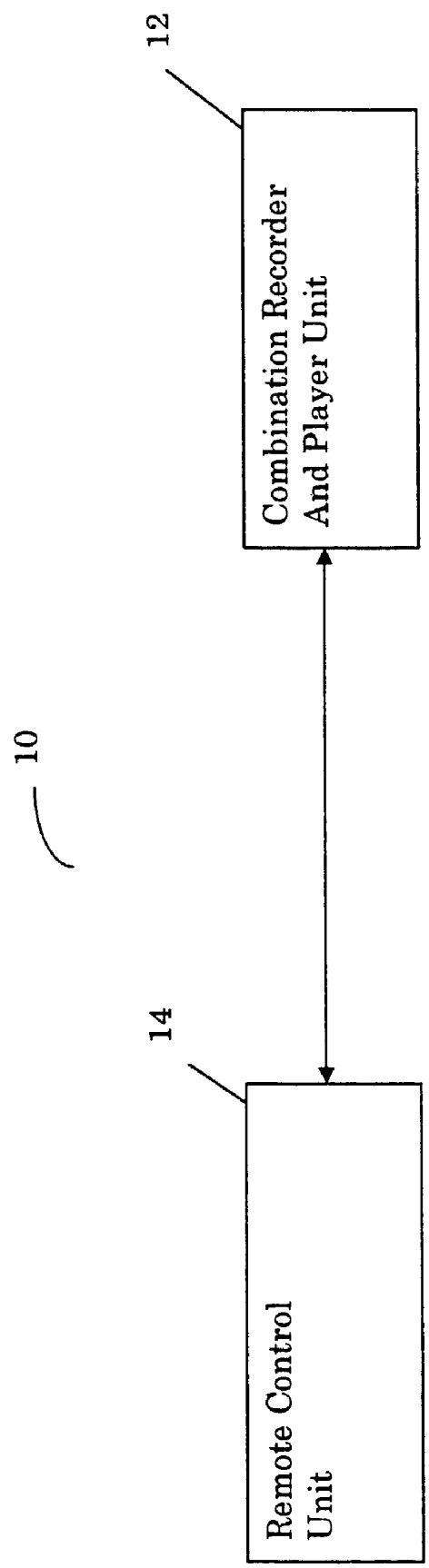
FIG. 1 is a block diagram showing one embodiment of the combination recorder and player system of the present invention.
Figure 2:
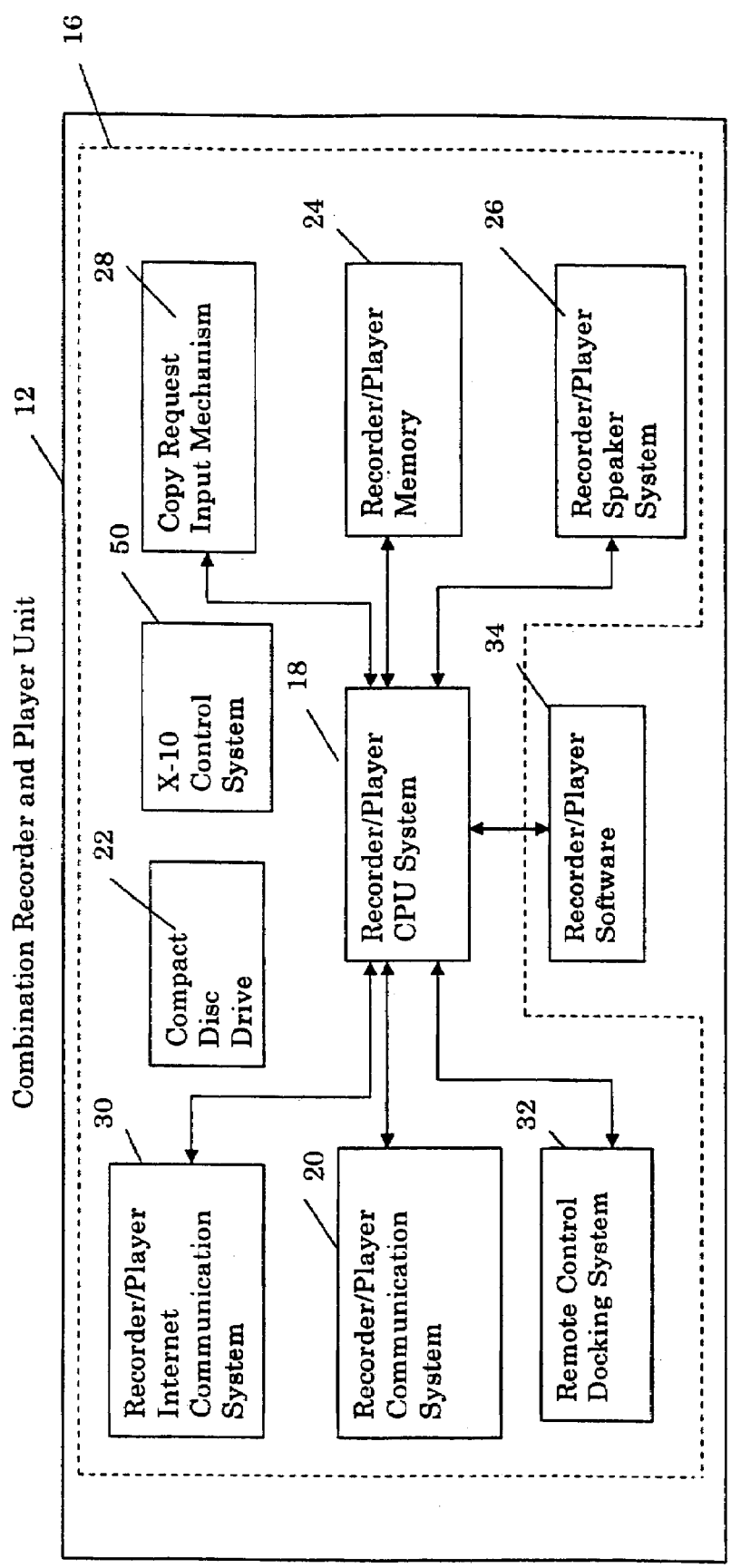
FIG. 2 is a block diagram showing one embodiment of the combination recorder and player unit shown in FIG. 1.
Figure 3:
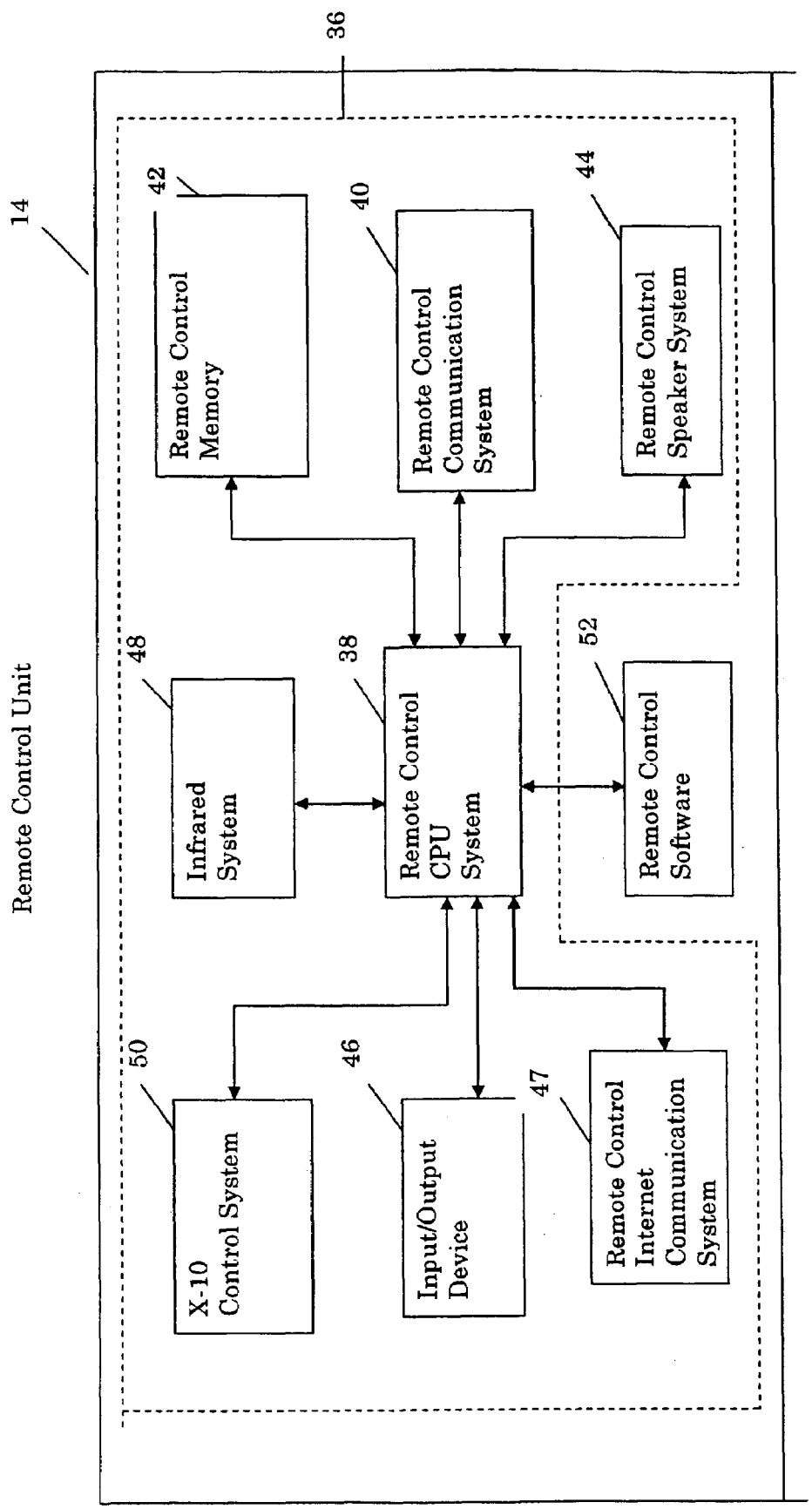
FIG. 3 is a block diagram showing one embodiment of the remote control unit shown in FIG. 1.

Referring to FIGS. 1-3 and FIG. 9, one embodiment of the present invention of a combination compact disc (CD) recorder and player system 10 includes a combination CD recorder and player unit 12 and a remote control unit 14. The recorder/player unit 12 includes a recorder/player computer system 16, which includes a recorder/player central processing unit (CPU) system 18, recorder/player communication system 20, a CD drive 22, recorder/player memory 24, a recorder/player speaker system 26, a copy request input mechanism 28, a recorder/player Internet communication system 30, a remote control docking system 32, and an X10 control system 50. The recorder/player unit 12 also includes novel recorder/player software 34 that is used to control the unit 12. The remote control unit 14 includes a remote control computer system 36, which includes a remote control CPU system 38, a remote control communication system 40, remote control memory 42, a remote control speaker system 44, an input/output device 46, an infrared system 48, a remote control Internet communication system 47, and an X-10 control system 50. The remote control unit 14 also includes novel remote control software 52 that is used to control the unit 14.

The Recorder/Player Unit 12

Figure 4:
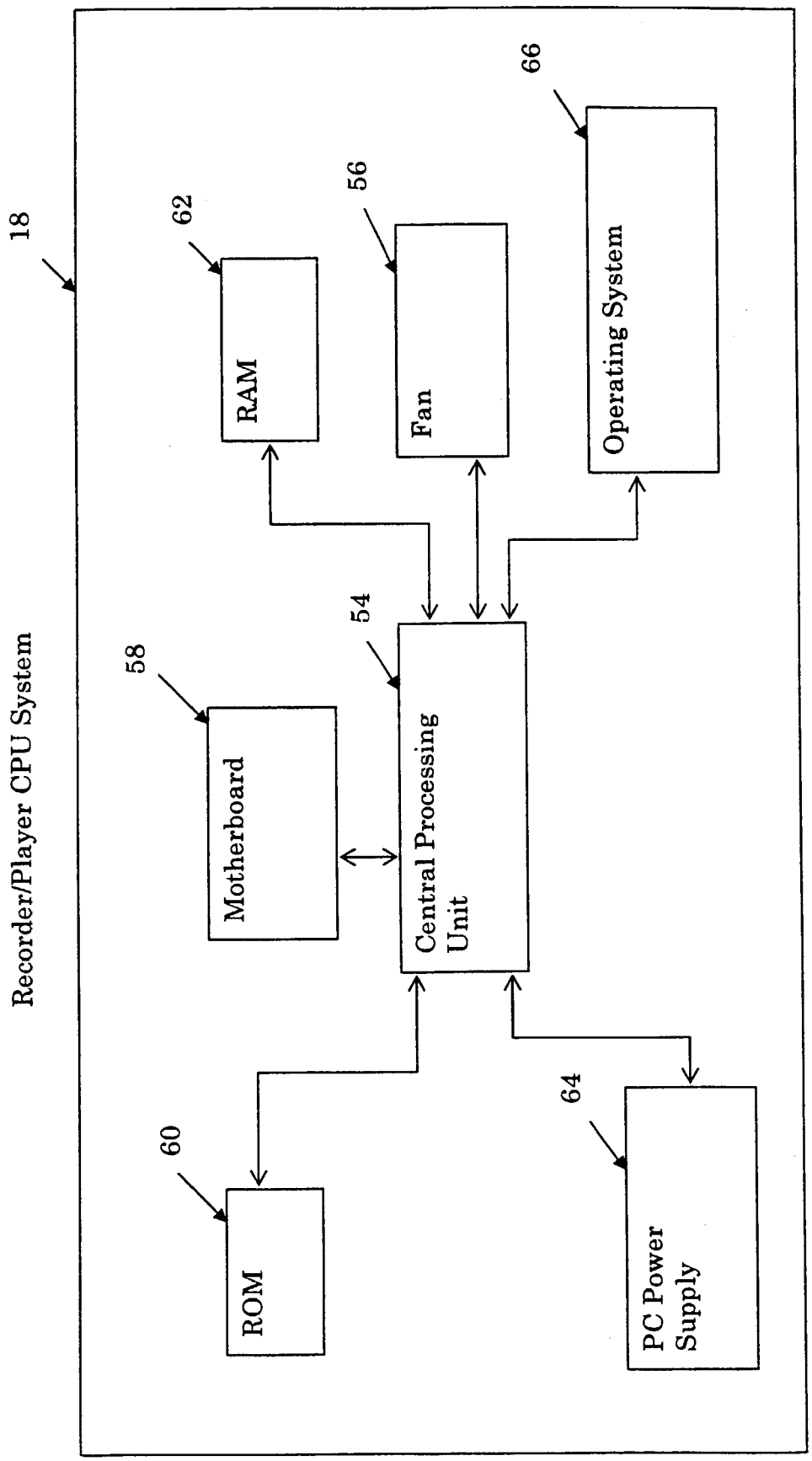
FIG. 4 is a block diagram showing one embodiment of the recorder/player CPU system shown in FIG. 2.

The recorder/player CPU system 18 is a conventional computer CPU system and is operable to execute instructions received from the recorder/player software 34. Referring to FIG. 4, the CPU system 18 includes a central processing unit (CPU) 54, a fan 56, a motherboard 58, ROM 60, RAM 62, a PC power supply 64, and an operating system 66. The type of CPU 54, fan 56, motherboard 58, power supply 64, and operating system 66 may vary depending upon the application. For example, in one embodiment the operating system 66 is a Windows XP Home Edition operating system. Other operating systems may be used as well. In addition, the amount of ROM 60 and RAM 62 will also vary depending upon the application. Accordingly, a variety of different components may be used in the CPU system 18. The selection of the components to use in the CPU system 18 is well within the ability of one skilled in the art and will not be discussed in further detail. Regardless of what components are used, however, the CPU system 18 must be able to execute any instructions received from the recorder/player software 34.

In one embodiment, the combination recorder and player unit 12 includes a Intel Pentium 4 processor, running at 2 gigahertz, a Shuttle XPC SB51G Mini Bear Bones System, which includes a front fire wire 1394 and USB2.0 Interface, 256 megabytes of PC, 2100 (266 megahertz) DDR (Double Data Rate) memory. In addition, the Unit 12 includes an integrated savage graphics card, 5.1 channel audio, and 10/100 local area networks (LAN) network card. The 5.1 channel audio card is the Realtek ACL 6500 sound card and the 10/100 LAN network card is Realtek 8100 B network card. The system also includes Aluminum Chassis with 200 watts of power and a Shuttle I.C.E. heat pipe cooling system.

The recorder/player communication system 20 is a wireless communication system that allows the unit 12 and the remote control unit 14 to communicate with one another. In one embodiment, the communication system 20 operates according to the IEEE 802.11b Wireless Networking standard. Accordingly, it includes an 802.11b card and its associated software. In alternative embodiments, the communication system 20 may operate according to the 802.11b Wireless Networking standard, the "Bluetooth" standard or any other standard or proprietary wireless techniques. In a preferred embodiment of the invention the remote control unit 14 over the 802.1b communication system is the only user interface for the unit 12.

The CD drive 22 is operable to read and write to compact discs in a variety of formats, including uncompressed and compressed audio formats. The CD drive 22 can read digital audio from conventional audio CDs and can also read .wav and .mp3 files from conventional data CDs. In a similar manner, the CD drive 22 can write digital audio to audio CDs in conventional CD audio format and can write .wav files and .mp3 files to data CDs. In one embodiment, the CD drive 22 is an Integrated Drive Electronics (IDE)/AT Attachment Packet Interface (ATAPI) CD recordable drive. In another embodiment, CD drive 22 is a 32×12×40×12 DVD and CDRW combination drive.

The recorder/player memory 24 is operable to store digital audio files in a variety of uncompressed and compressed audio formats, including original CD audio format, .wav files, .mp3 files, or any other conventional audio format. In one embodiment, the memory 24 is an 80 Gigabyte IDE/Ultra Direct Memory Access (UDMA) hard drive. In another embodiment the memory 24 is a 80 Gigabyte Ultra ATA/100/7200 RPM hard drive and includes digital audio from a number of CDs that has been preloaded on the unit 12. Memory systems are well known in the art and any one of a variety of different types of memory may be used as well.

The recorder/player memory 24 is also operable to store information that can be used to control multiple conventional pieces of audio and video equipment. For example, most TVs, VCRs, DVD players, and conventional CD players can be controlled remotely using infrared control signals. The recorder/player memory 24 includes the information necessary for the remote control unit 14 to use to generate these control signals using its infrared system 48. This information can be transferred, as needed, from the recorder/player memory 24 to the remote control memory 42, where it can be used by the remote control software 52 to generate the appropriate control signals.

The recorder/player memory 24 is further operable to store information identifying audio or video equipment based on the location of the equipment in a house. Accordingly, the recorder/player memory 24 includes information identifying audio or video equipment located in one or more rooms of a house and the information necessary to control these components. Again, this information can be transferred to the remote control memory 42, as needed, where it can be used by the remote control software 52 to generate the appropriate control signals.

The recorder/player speaker system 26 is operable to play audio output by the unit 12 and includes two low range speakers, 2 high range speakers, 2 speaker enclosures, and 2 internal audio amplifiers inside the speaker enclosures. The speaker system 26 also includes a sound card, which, in turn, includes a digital signal processing chip and a digital to analog converter. The sound card is used to convert digital audio from the memory 24 or from the CD drive 22 into analog audio so it can be output by the speakers in the speaker system 26. The sound card may be integrated onto the motherboard 58 of the CPU system 18 or it may be a separate card. Sound cards are well known in the art and any one of these devices may be used with the present system. For example, in one embodiment, the sound card is a savage graphics sound card known in the art.

The recorder/player speaker system 26 may also include additional speakers, which may be located remotely from the recorder/player unit 12. These remote speakers may be connected to the recorder/player unit 12 using any conventional means, including conventional speaker wires, wireless connections, or using the MaGIC communication technology developed by the applicant of the present invention. MaGIC, which stands for Media-accelerated Global Information Carrier, is an open architecture digital connection system developed by Gibson Guitar Corp, the assignee of the present application. The operation of the MaGIC system is described in detail in an engineering specification dated Jan. 22, 2002 and entitled Media-accelerated Global Information Carrier, Engineering Specification, Revision 2.4. The disclosure contained in that specification is hereby incorporated by reference into this application. The specification may be accessed at the following web address, http://magic.gibson.com/specification.html. In addition, the MaGIC system is described in detail in U.S. Pat. No. 6,353,169, issued to Juszkiewicz et al. on Mar. 5, 2002 and entitled "Universal Audio Communications and Control System and Method." The disclosure of the '169 patent is also hereby incorporated by reference into this application.

The copy request input mechanism 28 is operable to allow a user to input a copy command into the unit 12. In one embodiment, the mechanism 28 is simply a conventional push-button. A variety of other input mechanisms could be used as well. For example, the mechanism 28 might be a touch sensitive display integrated in the unit 12 that displays an electronic "Copy" button, which can be pressed by a user using a stylus.

The recorder/player Internet communication system 30 is operable to allow the unit 12 to communicate with the Internet. Internet communication systems are well known in the art and any one of these systems may be used. Conventional Internet communication systems include, among others, a modem with its associated software, a cable modem and its associated software, or a DSL modem with its associated software. The Internet communication system 30 may also include hardware and software that allow the unit 12 to communicate with the Internet using wireless technologies.

The remote control docking system 32 is used to connect the remote control unit 14 to the recorder/player unit 12. When the remote control unit 14 is connected to the unit 12, the docking system 32 supplies power to the remote control unit 14 and allows the unit 14 to conserve its batteries. The docking system 32 also includes the components necessary for charging the batteries in the remote control unit 14 and is operable to do so when the unit 14 is inserted into the docking system 32. The docking system 32 can also be used to charge spare batteries for the remote control unit 14. In one embodiment, the remote control docking system 32 is a USB cradle for Dell Axium X5 Personal Digital Assistant (PDA) that includes a power DC connector and a battery charge slot for charging either 1440 MAH and 3400 MAH batteries.

The X-10 control system 50 is operable to generate control signals that can be used to control light and appliances typically found in a home. The X-10 system 50 uses existing 110 Volt electrical wiring in a home to control lights and other appliances. The system 50 includes transmitters, which send a coded low voltage signal over the 110 V wiring, and receivers, which are plugged into the 100V power supply and will see the coded low voltage signal. The receivers are designed, however, to only respond to signals that include the appropriate address. In other words, each receiver has a unique address and will only respond to signals that include that address. Up to 256 different addresses can be used with this system. X-10 technology is known in the art and detailed information regarding this technology may be found on the Internet. For example, detailed information regarding X-10 technology and products may be obtained from Smarthome, Inc., a company that specializes in home automation, located at 16542 Millikan Avenue, Irvine, Calif. 92606-5027.

The recorder/player software 34 is operable to cause the recorder/player computer system 16 to record digital audio from conventional audio CDs to the recorder/player memory 24, to play digital audio from conventional audio CDs and memory 24, and to create, or "burn," new CDs using audio stored in memory 24. The software 34 is also operable to cause the computer system 16 to record .wav and .mp3 files from conventional data CDs to the memory 24. The software 34 is written in C++, but could be written in a variety of other conventional programming languages.

The software 34 is further operable to cause the computer system 16, at predetermined times, to automatically download to memory 24 additional digital audio, in .wav, .mp3, or other conventional formats, program guides for music broadcast over the Internet, and TV guides for local broadcasts of cable, satellite, local stations. The music broadcast may include both older music content as well as the latest hits. The program guides include information regarding songs that will be "broadcast" via the Internet for a week in advance. The TV guides include recommendations, full program descriptions and reviews. In one embodiment, the TV guide program is similar to the scrolling TV program guide that appears on designated cable TV channels and is used by many cable companies, such as Comcast, to provide their customers with programming information. The music program guides will appear and operate in a similar manner as well.

The software 34 is still further operable to automatically monitor the number of times that a song is played by the unit 12 and, at predetermined times, to automatically send this information to a subscription service using the Internet. The information sent to the subscription service may also include information regarding the number of times a song has been copied to a recordable CD by the recorder/player unit 12 or the number of times a song has been copied to the remote control unit 14 associated with the unit 12. The software 34 may also be operable to prevent copying of a song to any device other than recordable CDs that have been inserted into the CD drive 22 or the remote control unit 14 associated with the unit 12. Finally, the software 34 may be operable to prevent any device from accessing audio stored on the recorder/player unit 12 using the Internet.

To perform the various functions of recording, playing, and burning CDs, the software 34 includes several modules. The first module is a CD audio "ripper" module that is capable of pulling digital audio off of a conventional audio CD and storing it in memory 24. The ripper module can store the digital audio as a .wav file, an .mp3 file, or any other conventional audio format. In one embodiment, the ripper module uses standard Windows XP WindowsMedia 9 Active-X control to read audio from audio CDs. There are a variety of other techniques for reading and storing audio ripped from an audio CD and any one of these techniques may be used as well.

The second module is a CD player module, also referred to as Virtual Player module that is capable of playing digital audio from a conventional CD and from the memory 24. The Virtual Player module is used by an audio engine to play digital audio and includes a circular buffer, which is used for real-time sources such as streamed Internet or auxiliary input, to provide limited transport control, and to maintain a limited history of songs. The module is used with MP3 sources to provide high-quality, auditioned fast-forward and rewind features. The second module also includes a Direct-X play engine, which is included with the Windows XP operating system referenced above. The play engine accesses audio transparently from the Virtual Player.

The third module, the CD burner module, is operable to burn new CDs using the audio stored in memory 24. The CD burner module can burn CDs in multiple conventional formats, including .wav and .mp3 formats. In one embodiment, the CD burner module uses a standard XP Image Mastering Applications Programming Interface (IMAPI) Software Development Kit (SDK) to burn audio CDs. In alternative embodiments, other burner modules may be used as well. The CD burner module is also operable to burn CDs using any one of the variety of personal computer copy prevention technologies known in the art so they cannot be copied by a personal computer. In one embodiment, CDs are burned so the audio files cannot be seen by the CD-ROM drive of a personal computer and cannot be copied. In other embodiments, CDs are burned so that the audio on the burned CD includes errors that cause clicks and pops to appear in any copies of the burned CD. Several companies provide copy protection systems and detailed information regarding these systems can be found on the Internet. For example, Macrovision, Sony, and Sunncomm all provide such systems and information regarding these companies is available on the Internet.

The software 34 further includes an MP3 encoder module, an MP3 decoder module, and a database module. The MP3 encoder module is operable to compress digital audio from a conventional audio CD into .mp3 file format and the MP3 decoder is operable to decompress digital audio that has been compressed in .mp3 file format. In one embodiment, the MP3 encoder module, using a publicly available code library known as "Blade," encodes a stream of CD format PCM audio into 128-256 BPS Moving Pictures Expert Group (MPEG) format compressed audio. In alternative embodiments, other types of known compression technologies may be used as well. In this embodiment, the MP3 decoder module decodes a stream of MPEG 3 format compressed audio and converts it into CD format PCM audio, i.e., the inverse of the MP3 encoder.

The database module is used to store digital audio as a database in the memory 24. The database includes multiple indexes and uses standard B-tree technology to store the audio. Database modules, such as Access, IBM DB2, and Oracle are well known in the art and any one of these database modules may be used as well.

The software 34 also includes a CDDB module that is operable to find the names of CDs and songs on those CDs by accessing a well-known database of that information on the Internet. A company called Gracenote in Berkeley, Calif. maintains this database. The names of CDs and songs may also be stored on an internal database in memory 24. In this case, the CDDB module accesses this database to obtain the desired information.

The unit 12 is capable of being operated in several different modes. In a first mode, which is referred to as an Automatic Copy Mode, the unit 12 will automatically copy the digital audio, .wav, or .mp3 files into the recorder/player memory 24 when an audio CD or data CD is inserted into the CD drive 22. In a second mode, which is referred to as the One-Button Copy Mode, the unit 12 only copies information into the recorder/player memory 24 after a user has input a copy command into the unit 12 using the copy request input mechanism 28.

In the second mode, the copy request input mechanism 28, which is a conventional push-button or switch in this example, can be used by a consumer to automatically copy, by pressing the push-button, a conventional audio CD (not shown) that has been inserted into the CD drive 22 into the recorder/player memory 24. When the button 28 is pressed, the recorder/player software 34 causes the recorder/player computer system 16 to copy the digital audio stored on the CD to memory 24. By default, the computer system 16 saves all digital audio in an uncompressed format. For example, in one embodiment, the computer system 16 saves the digital audio from the CD in conventional wave file format, i.e., with a .wav file extension. The default setting can be changed as desired so the unit 12 can save the digital audio in any other conventional format as well. For example, the default setting can be changed so that the digital audio is saved in a compressed format, such as conventional MP3 file format. The remote control unit 14 is used to change the default setting for the unit 12 and this process is discussed in detail below in conjunction with the detailed discussion of the remote control unit 14.

The copy request input mechanism 28 can also be used to automatically copy .wav files and .mp3 files from conventional data CDs. If a conventional data CD is placed in the CD drive 22 and the copy button 28 is pressed, the recorder/player software 34 causes the recorder/player computer system 16 to copy any files on the CD to memory 24. If the files are .wav files, the computer system 16 saves the files in memory 24 as .wav files. If the files are .mp3 files, the system 16 saves the files in memory 24 as .mp3 files. Once again, this is the default setting for the unit 12 and this setting can be changed. For example, the default settings can be changed so that .wav files are automatically compressed into .mp3 format before they are stored in memory 24.

As mentioned previously, the recorder/player computer system 16 is also operable, again under the control of the recorder/player software 34, to play conventional audio CDs. As was the case with copying CDs, the unit 12 is capable of playing CDs in two different modes. In an Automatic Play Mode, the unit 12 automatically plays any CD that is inserted into the CD drive 22. The unit 12 can also be set up so that it does not play a CD inserted into the CD drive 22 until the unit 12 receives a play command, described in more detail below, from the remote control unit 14. In addition, the unit 12 can be set up so that it automatically copies all of the digital audio to the recorder/player memory 24 and then begins playing the CD. All of these features can be adjusted using the remote control unit 14.

To burn a CD, a user uses the remote control unit 14, in a manner that is described in more detail below, to input a burn command to the unit 12. The burn command contains information identifying the songs that are to be burned onto the CD and the format that is to be used during the burning process. The default setting for the format is compressed MP3. This setting can be changed using the remote control unit 14, however, and the computer system 16 can burn CDs in original uncompressed digital audio CD format.

Figure 9:
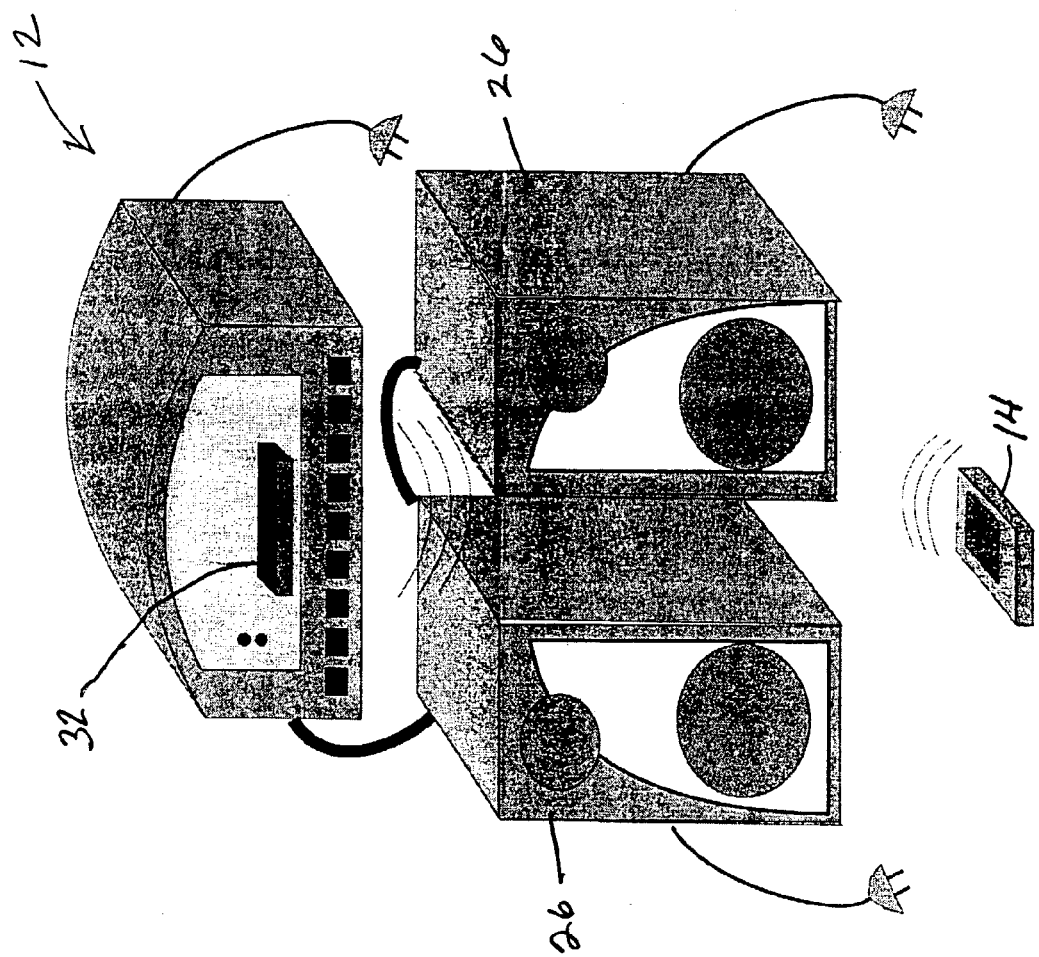
FIG. 9 is a drawing showing one embodiment of the recorder/player unit of the present invention.

To make the appearance of the recorder/player unit 12 more appealing, the housing of the unit 12 includes features that are found on an old-fashioned jukebox. For example, the housing may include animated bubble tubes, changing color columns, a revealed CD changing mechanism, conventional input buttons typically found on a traditional jukebox, multiple pages containing listings of CDs and the songs on those CDs, or any of a variety of other jukebox features typically included on such devices. For example, the unit 12 may be constructed to mimic the features of a Wurlitzer Model 1015 jukebox. A generic drawing of one embodiment of the housing of the unit 12 is shown in FIG. 9.

The Remote Control Unit 14

Figure 5:
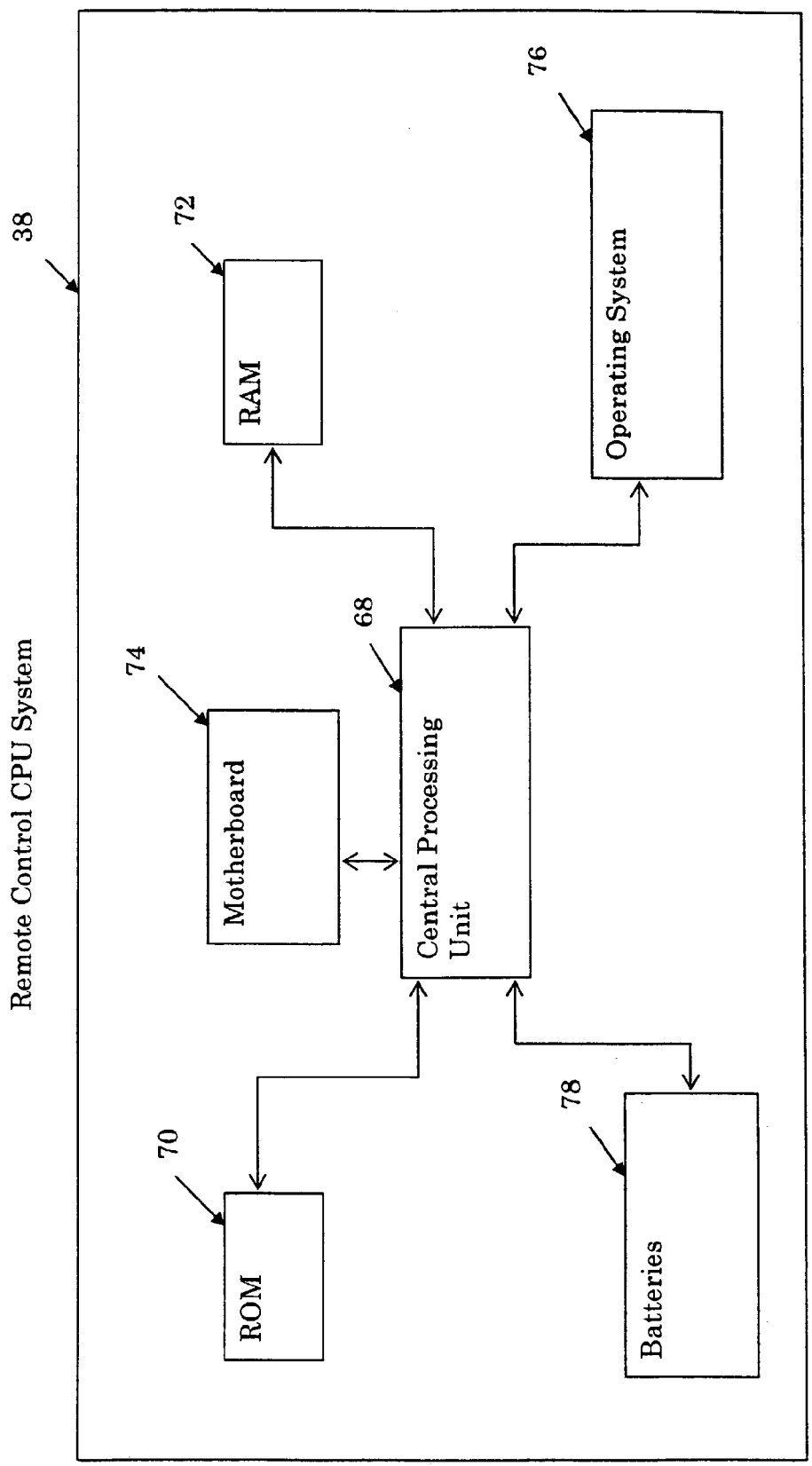
FIG. 5 is a block diagram showing one embodiment of the remote control CPU system shown in FIG. 3.

The remote control CPU system 38 is a conventional computer CPU system, similar to the recorder/player CPU system 18, and is operable to execute instructions received from the remote control software 52. Referring to FIG. 5, the CPU system 38 includes a CPU 68, ROM 70, RAM 72, a motherboard 74, an operating system 76, and batteries 78. As was the case with the recorder/player CPU system 18, these components may vary depending on the application. In one embodiment, for example, the remote control unit 14 is a conventional Personal Digital Assistant (PDA), the Dell Axium X5 manufacturer by Dell Corporation. The Axium X5 may include an Intell XSCALE processor operating at 400 megahertz or 300 megahertz, 32 megabytes or 64 megabytes of CDRAM, and 32 or 48 megabytes of flash Rom. The Axium also includes a Microsoft Pocket PC 2002 Premium Edition Operating System, Internet Explorer, a removal lithium ion battery, and optional high capacity lithium ion battery. The Axium X5 also includes a stereo headphone connector and infrared data associate (irDA) port for outputting infrared signals and optional 802.11b wireless Compact Flash (CF) card for network or Wireless Fidelity (WiFi) activity. The Axium also includes a built in microphone and speaker system.

The remote control communication system 40 is identical to the recorder/player communication system 20 discussed in detail previously. Thus, it is a wireless communication system that allows the unit 12 and the remote control unit 14 to communicate with one another using the 802.11b Wireless Networking standard. When a PDA is used for the remote control unit 14, the remote control communication system 40 is integrated into the PDA as indicated above.

The remote control Internet communication system 47 is identical to the recorder/player Internet communication system 30 discussed in detail previously. Thus, it allows the unit 14 to communicate with the Internet and may also include hardware and software that allow the unit 14 to communicate with the Internet using wireless technologies. As was the case with the remote control communication system 40, the remote control Internet communication system 47 can be integrated into a PDA.

The remote control memory 42 is capable of storing digital audio, in .wav, .mp3, or any other conventional audio format. In one embodiment, the memory 42 is 64 MB of SDRAM. The amount of memory required varies from application to application and is dependent upon the amount of digital audio to be stored on the remote control unit 14. Memory systems are well known in the art and any one of a variety of different types of memory may be used as well. As indicated previously, the remote control memory 42 is also capable of storing information that can be used to control multiple conventional pieces of audio and video equipment, information identifying audio or video equipment located in one or more rooms of a house, and the information necessary to control these components.

The remote control speaker system 44 is operable to play audio stored in memory 42 or streaming audio received from the recorder/player unit 12. In one embodiment, the speaker system 44 includes conventional headphone components and can be used to listen to audio using a conventional headphone. In another embodiment, the speaker system 44 is the speaker system found in the Dell Axium X5 PDA. As was the case with the speaker system 26 on the unit 12, the speaker system 44 includes a sound card to convert digital audio into analog audio so it can be played by the speaker system 26.

The input/output device 46 is operable to display various menus to a user and to allow the user to input various commands, such as a copy command, play command, or a burn command. In one embodiment, the input/output device 46 is a 3.5" touch sensitive, full color, transflective display with 320×240 pixel resolution. In alternative embodiments, other types of input/output devices may be used.

The infrared system 48 is operable to generate infrared control signals and can be used to control various conventional pieces of audio and video equipment found in the typical home. For example, the infrared system 48 can be used, in conjunction with the remote control software 52, to control conventional TVs, stereos, DVD players, and VCR players. PDAs use different infrared communication protocols than older conventional TV and audio/video remote control systems and the infrared system 48 in the present invention is adapted to use the appropriate infrared communication protocols. In alternative embodiments, the infrared system 48 may include commercial off-the-shelf components that are known in the art that allow one to modify the infrared system of a PDA so that it can be used to control conventional TVs and other audio/video equipment.

Figure 10:
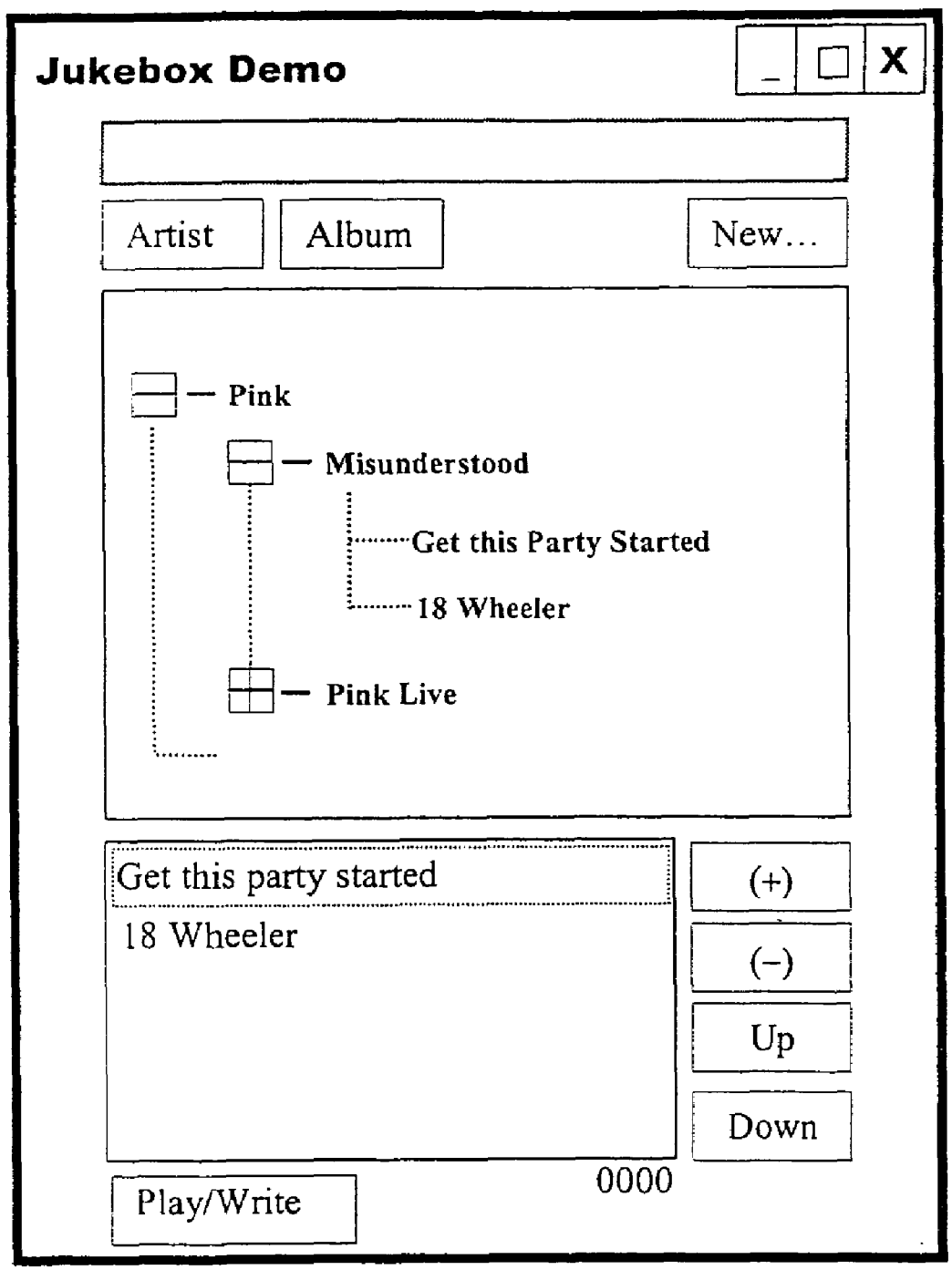
FIGS. 10-12 are screen shots generated by one embodiment of the remote control unit of the present invention.
Figure 11:
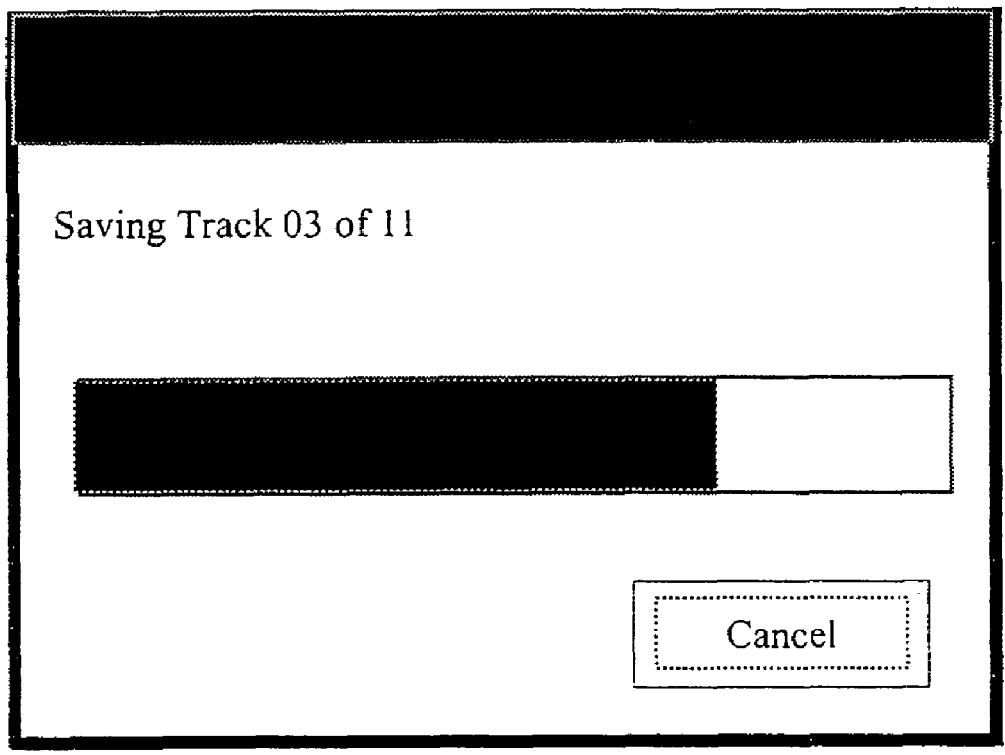
Figure 12:
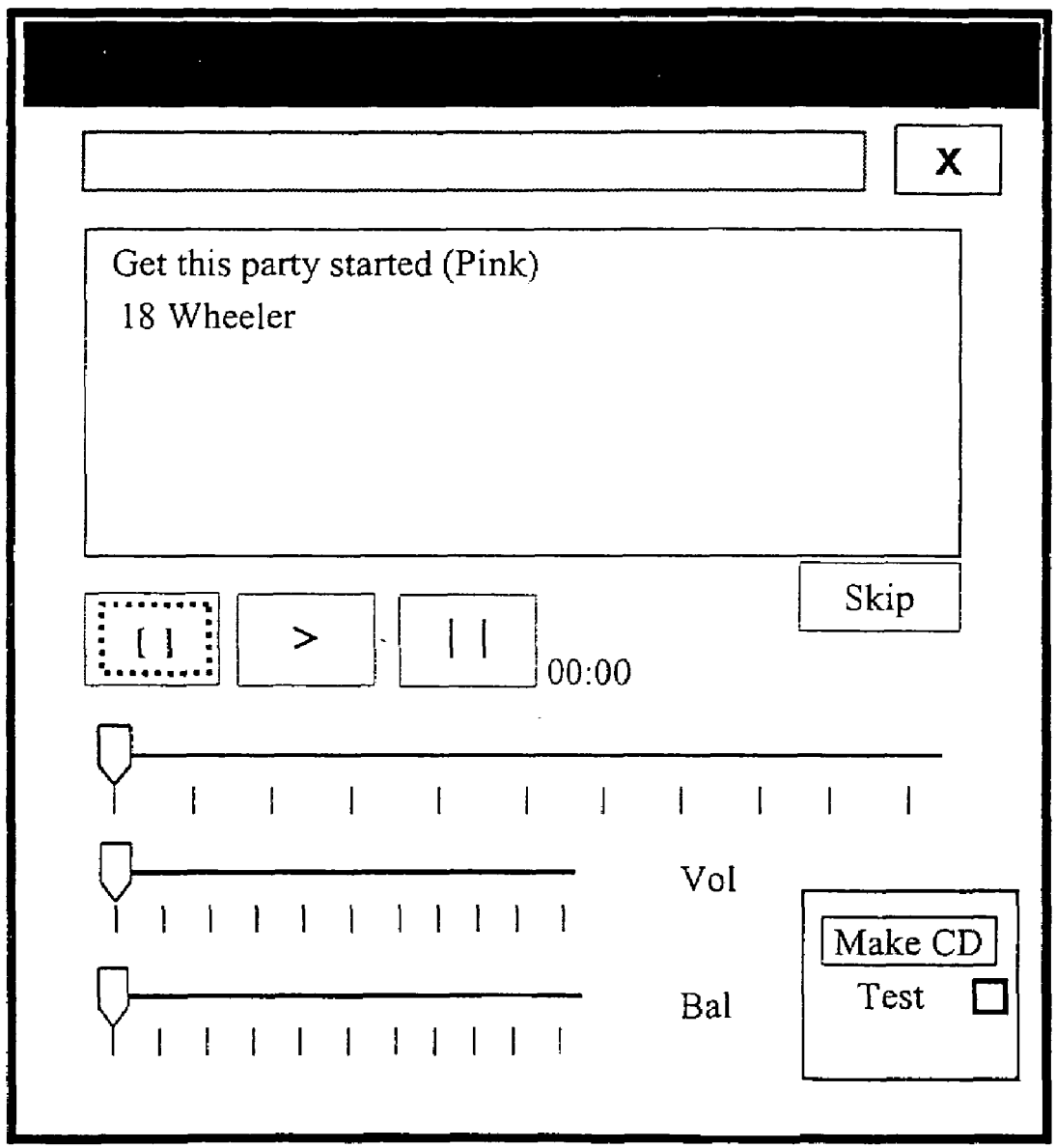

The remote control software 52 can be used by a user to copy CDs into memory 24 on the unit 12 or into memory 42 on the unit 14, to play digital audio on CDs in the CD drive 22, memory 42, or memory 24, and to burn CDs using the CD drive. To allow a user to perform these various functions, the software 52 generates a series of screens or menus that allows a user to input commands to perform these functions. For example, in one embodiment, the software 52 generates the screens shown in FIGS. 10-12. The screen shown in FIG. 10 can be used to input a request to copy a song from a CD onto the recorder/player unit 12 or to play a song on a CD, and the screen shown in FIG. 12 can be used to copy or "burn" a song from the recorder/player unit 12 to a CD. FIG. 11 includes a screen that is displayed when a song is being copied from a CD onto the recorder/player unit 12.

The applicant contemplates that the software 52 can be programmed to generate a variety of different screens depending on a specific application. Accordingly, in an alternative embodiment, the software 52 generates a main menu on the input/output device 46 that includes a "Copy audio" button, a "Play audio" button, and a "Burn audio" button.

When the "Copy audio" button is pressed, the software displays a second screen that includes a first button, which reads "Copy audio to recorder/player", and a second button, "Copy audio to remote control." When the first button is pressed by a user using a stylus, the software 52 sends a copy command to the recorder/player unit 12 requesting that digital audio from a CD in the CD drive 22 be copied into memory 24. In response, the recorder/player software 34 copies all of the audio on the CD in the CD drive 22 into memory 24. When the second button is pressed, the software 52 displays a screen that includes two buttons. One button reads, "Copy audio from CD" and the other reads, "Copy audio from recorder/player memory." When the "Copy audio from CD" button is pressed, the software 52 sends a copy command to the unit 12 requesting that digital audio on a CD in the CD drive 22 be copied into the remote control memory 42. In response, the recorder/player software 34 copies audio from a CD and sends it to the unit 14, where it is copied into the remote control memory 24 by the remote control software 52. When the "Copy audio from recorder/player memory" button is pressed, the software 52 sends a copy command to the unit 12 requesting that audio stored in the recorder/player memory 24 be copied into the remote control memory 42. In response, the recorder/player software 34 sends audio from the recorder/player memory 24 to the unit 14 and the remote control software 52 copies the audio into the remote control memory 42.

When either copy button is pressed, a format screen will be displayed that includes several formatting buttons, including a ".wav format" button, and a ".mp3 format" button. The user selects the desired format and the software 52 stores the audio accordingly. If a compressed format, such as MP3 is selected, the software 52 uses the MP3 encoder module to compress the audio. In addition, when either copy button is pressed, the software 52 displays a series of screens that allow the user to select the songs to be copied by the software 52.

When the "Play audio" button is pressed, the software 52 displays a screen that includes a "Play CD in CD drive" button, a "Play audio stored on recorder/player" button, and a "Play audio stored on remote control" button. When either of the first two buttons are pressed, the software 52 sends a play command to the unit 12 and the recorder/player software 36 plays the appropriate audio. The play command includes information indicating that audio from a CD or audio stored in memory should be played. By default, if audio from a CD or from the recorder/player memory 24 is selected, the software 52 plays the audio using the recorder/player speaker system 26. If audio stored on the remote is selected, the software 52 plays the audio using the remote control speaker system 44.

Regardless of which play button is pressed, the software 52 also displays a series of screens that allow a user to select the audio to be played. In one embodiment, the screens include information that is typically included on a conventional jukebox, e.g., a CD will have an associated number, for example, 46, and the songs on the CD will have associated numbers, for example, 01 for the first song, 02 for the second song, etc. To select a specific song on a specific CD, a user simply inputs, using number buttons displayed on the input/output device, the desired CD number and song number.

When the "burn audio" button is pressed, the remote control software 52 sends a burn command to the recorder/ player software 34. In response to the burn command, the recorder/player software 34 burns audio onto a CD in the CD drive 22. As was the case with the copying commands, the software 52 displays a format screen that allows a user to specify the desired format for the burning process. CDs can be burned in original CD format, .wav format, or .mp3 format. In addition, the user is allowed to select the songs to be burned by using series of screens that allow the user to select the desired songs. As was the case with the play commands, in one embodiment, the screens include information that is typically included on a conventional jukebox, e.g., a CD will have an associated number, for example, 46, and the songs on the CD will have associated numbers, for example, 01 for the first song, 02 for the second song, etc. To select a specific song to burn on a CD, a user simply inputs, using number buttons displayed on the input/output device, the desired CD number and song number.

Internet Based Music Distribution Service

As noted above, the recorder/player unit 12 is constructed to receive and record audio over an Internet communication system 30. The recorder/player units 12 provide a unique system for receiving audio that allows a much different business model to be followed as compared to the business models which can be achieved using non-proprietary receivers such as conventional television sets or personal computers.

The use of proprietary hardware, in combination with a system of uniquely identifying each recorder/player unit 12, allows the proprietor of that hardware and of the associated music service to build in a proprietary protection scheme to uniquely control the overall system. This solves a number of significant business issues which heretofore have prevented the satisfactory achievement of an Internet based music downloading service.

A primary issue which must be dealt with from the business standpoint in order to establish a successful Internet based music service is to protect the copyrighted music content belonging to the record labels which produce the compact disc recordings and to track, report and pay royalties on the usage of this music content in a manner satisfactory to the record labels. This includes tracking and payment of "mechanical royalties" to the underlying copyright holders for additional copies which may be made by burning CDs, and also includes the tracking and payment of performance royalties to the performing rights societies such as BMI and ASCAP.

Another aspect of this copy protection is provided by encoding the digital audio which can be burned onto a recordable CD by the recorder/player unit 12 such that the recorded CD cannot subsequently be duplicated in a playable form. As discussed above, the copy protection may be implemented in any number of ways, including by burning audio so that it is hidden from personal computer CD drives and cannot be copied or so that it includes errors that cause clicks or pops to appear in copies of burned CDs, which prevents usable copies from being made.

A related issue is to provide the ability to track and identify the source of any unauthorized copies which are somehow made by hackers who break whatever copy prevention mechanisms are provided by the recorder/player unit 12. The tracking of unauthorized music is accomplished by the music server system described below by "watermarking" the recordings with a unique identification associated with the specific recorder/player unit 12 which records the music, so that if subsequent unauthorized copies are distributed, the source of them can be identified by examination of this unique identification. Privacy of the users of the recorder/player units 12 is provided in that the operator of the music server system maintains the database of recorder/player unit identifications and associated owners' names, addresses, etc. and can control the dissemination of customer identification only upon an appropriate showing of misuse of the licensed content by the customer.

Still another issue of major concern to the record labels is to minimize the erosion of CD sales. This is accomplished in the system described below by transmitting the audio only in a compressed reduced quality format such as .mp3 as opposed to the uncompressed files sold in retail record stores in CD format. As a result, the music which is received over the Internet music service by the player/recorder units 12, and which is subsequently burned by those player/recorder units 12 onto CDs and/or subsequently saved to memory on the recorder/player unit 12 or on the hand held remote control unit 14, is of a lower quality than the music contained on a conventional CD which would be purchased at a retail record store.

Thus the music server system described below in combination with an installed base of the recorder/player units 12 effectively provides a system which can replace commercial radio, but which cannot ultimately replace the supply of the highest quality digitally recorded music found on CDs which are manufactured by the record labels and sold in conventional record stores.

The present system will allow its operator to broadcast multiple channels of music content similar to multiple radio station broadcasts, except that the broadcasts are over the Internet and can only be received by consumers who own one of the proprietary player/recorder units 12 and who are currently authorized after payment of suitable monthly fees and usage charges.

Each individual subscriber who has possession of one of the player/recorder units 12 will be charged for their own usage of the received music content and the collective usage of all users will be reported by the operator of the Internet based music service system to the record labels along with payments to the record labels. Information about individual consumers will only be provided to a record label or other content owner in the event of a showing of misuse of the music content, which can be tracked due to the unique identification embedded in the recorded music received by and stored on the recorder/player unit 12.

By providing a system as described above, the record labels can be assured of the protection of their own business models, thus providing incentive to the record labels to license the use of their music content for distribution over the Internet based music server system described below. As will be appreciated by those skilled in the art, in the absence of the contractual cooperation of the major record labels, it will be impossible for any operator to legally provide an Internet based music server system that has the content customers want.

Figure 6:
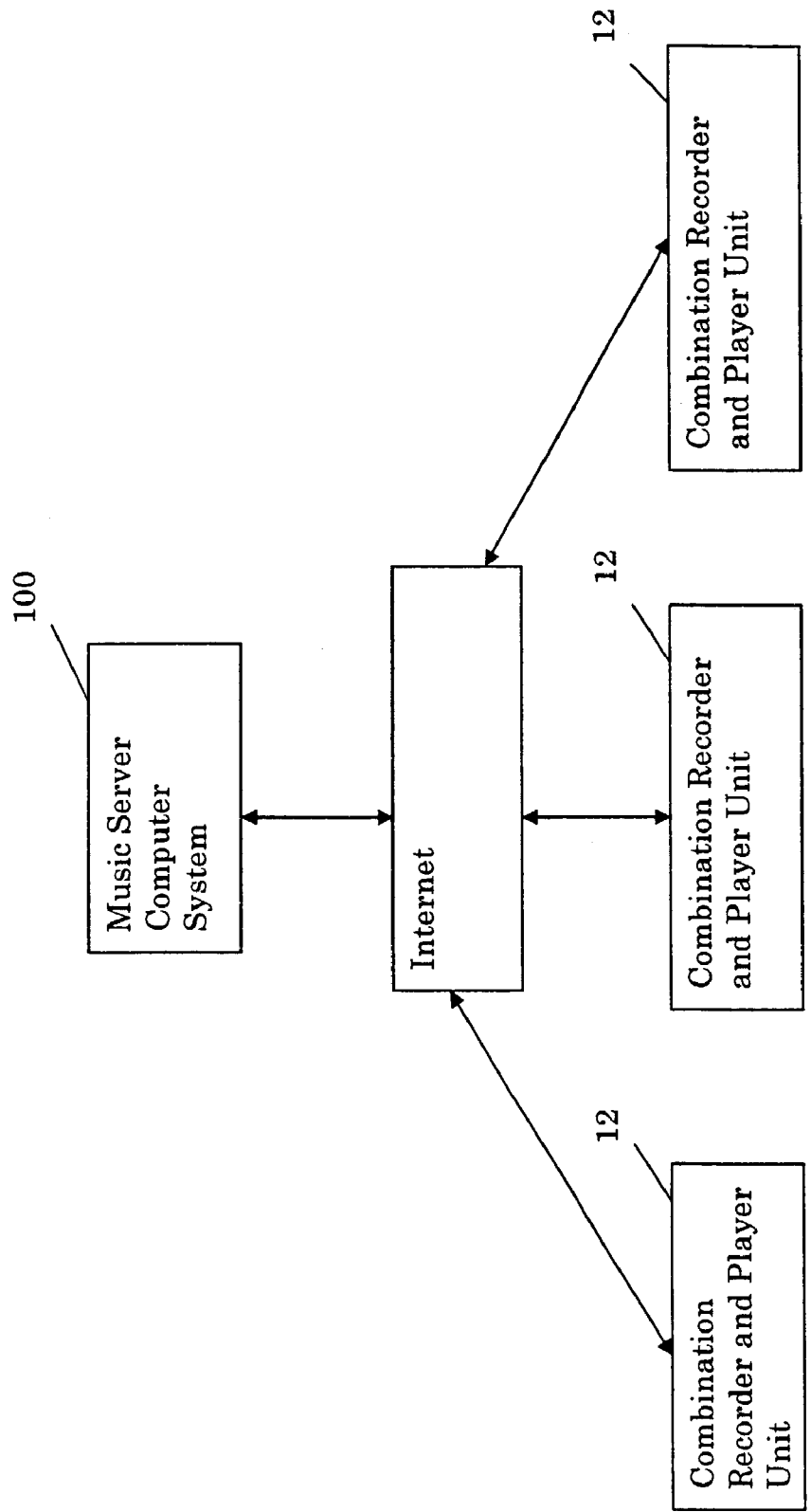
FIG. 6 is a block diagram showing a music server computer system communicating with a plurality of recorder/player units over the Internet.
Figure 7:
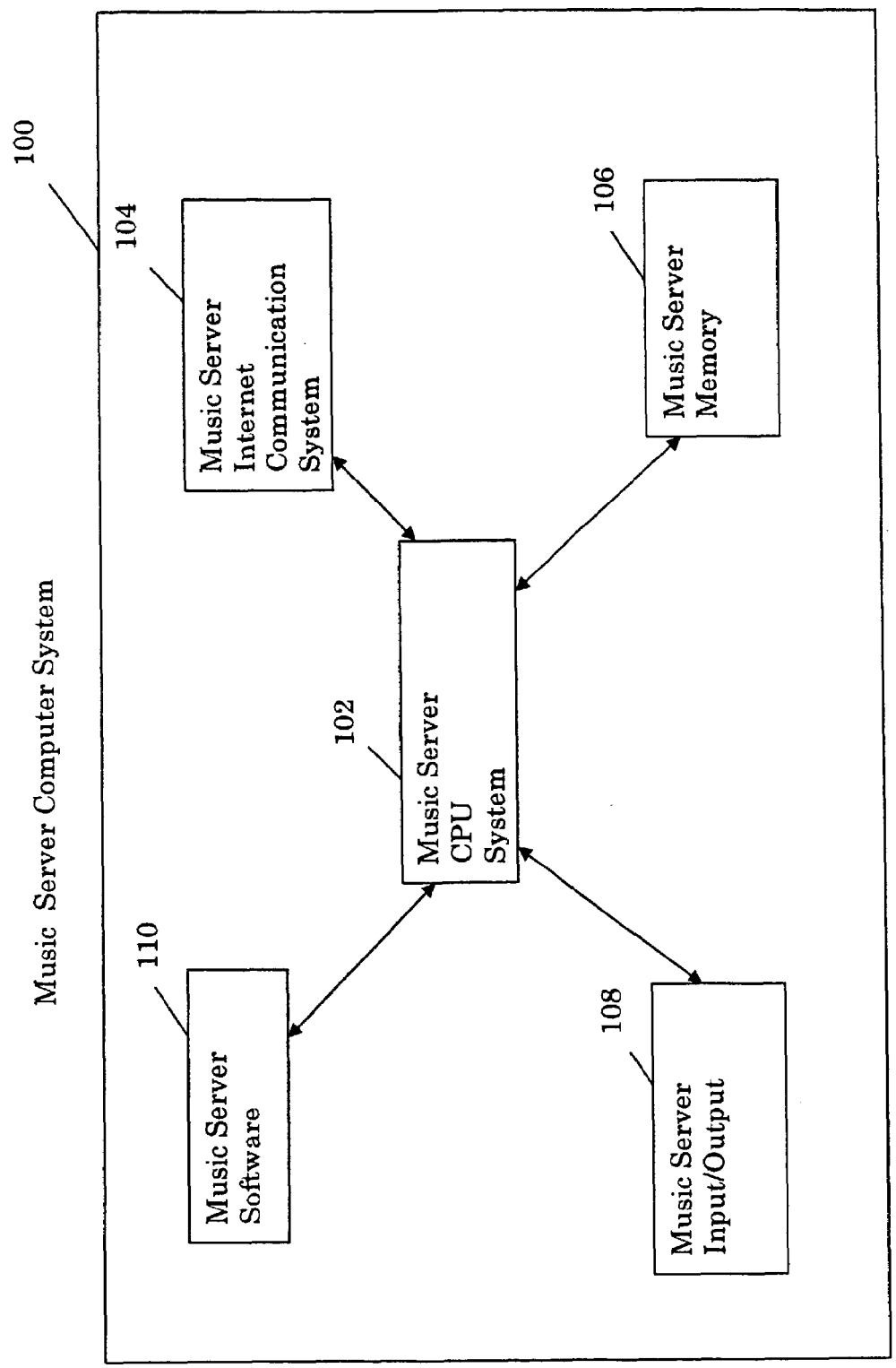
FIG. 7 is a block diagram of the music server computer system.
Figure 8:
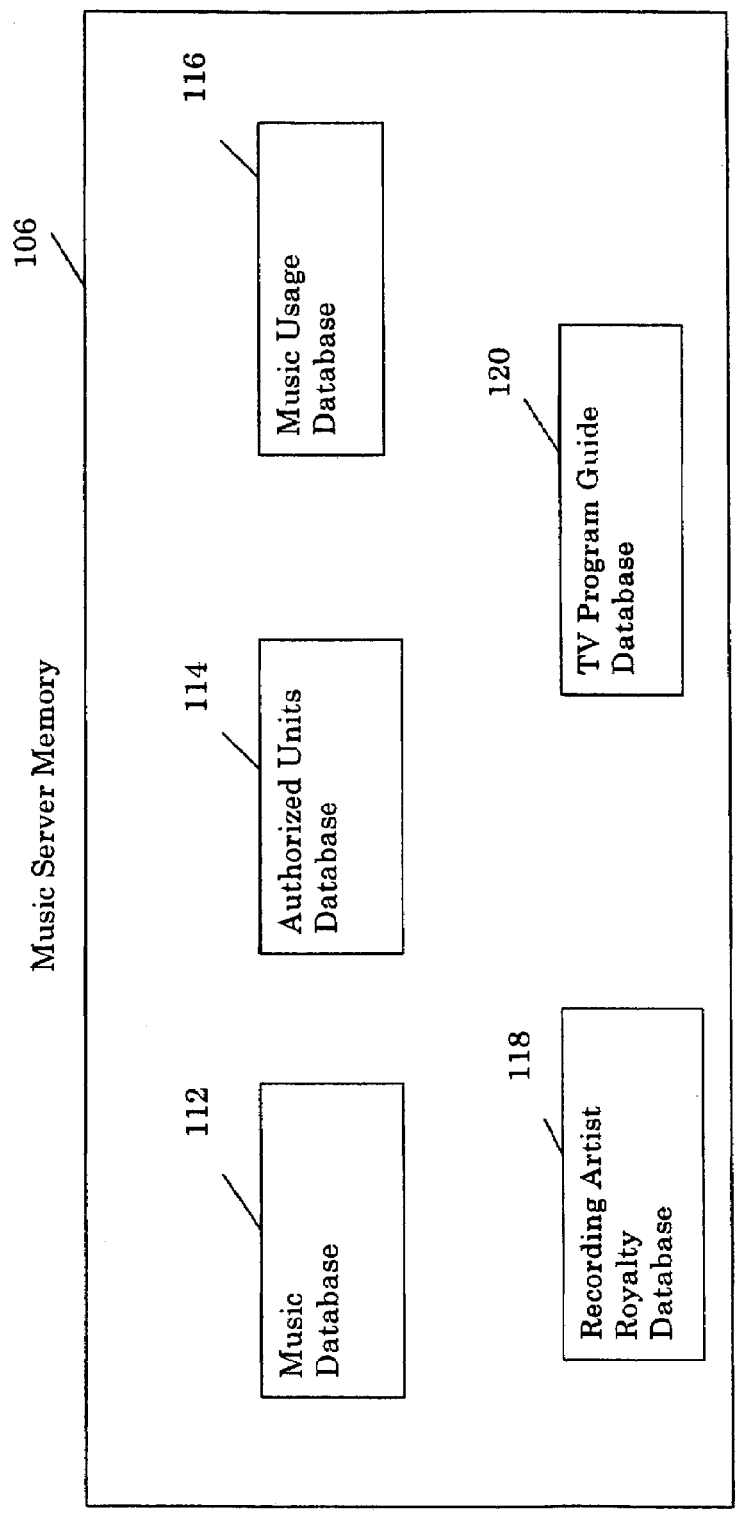
FIG. 8 is a block diagram of the music server memory.

Referring to FIGS. 6-8, the present invention includes a novel music server computer system 100 that can be connected to a plurality of combination recorder and player units 12 over the Internet. The music server 100 includes a music server CPU system 102, a music server Internet communication system 104, music server memory 106, music server input/output 108, and music server software 110.

The music server CPU system 102 is a conventional server CPU system well known in the art and is operable to process instructions and data in order to perform various functions. The CPU system 102 includes a central processing unit (CPU), ROM, RAM, and an operating system. As is well known in the art, the CPU and operating system may vary depending upon the application. In a similar manner, the amount of ROM and RAM used in the music server 100 may vary as well.

The music server Internet communication system 104 is operable to allow the music server 100 to communicate with the Internet. Internet communication systems are well known in the art and any one of these systems may be used. Conventional Internet communication systems include, among others, a modem with its associated software, a cable modem and its associated software, or a DSL modem with its associated software. The Internet communication system 104 of the present invention includes a cable modem and also includes hardware and software that allows the music server 100 to communicate with the Internet using wireless technologies.

The music server memory 106 is operable to store digital audio files in a variety of compressed audio formats, including the well-known .mp3 file format. Although in the preferred embodiment, the audio files are stored as .mp 3 files, the audio files could be stored in other conventional formats as well, including uncompressed audio formats such as the well-known .wav file format. Memory systems are well known in the art and any one of a variety of different types of memory may be used as well. For example, the music server memory 106 may be simply a hard drive system in some applications.

Referring to FIG. 8, the music server memory 106 includes a music database 112, an authorized units database 114, a music usage database 116, a recording artist royalty database 118, and a TV program guide database 120. The music database 112 includes digital audio that can be transmitted to multiple units 12 using the music server 100. In a preferred embodiment, the digital audio is stored and broadcast in .mp3 compressed audio format. The music database 112 also includes program guides containing information regarding digital music broadcasts currently being broadcast, as well as the dates and times of past and future digital music broadcasts by the music server 100.

The authorized units database 114 includes information regarding combination recorder and player units 12 authorized to receive digital music broadcasts. This information includes a unique unit identification number and ownership identification information, such as name of owner, address, telephone number, billing address, etc., for each authorized unit 12. The unique identification number may vary from application to application. In general, however, this number should include sufficient information to uniquely identify the unit 12 associated with the number and, at the same time, make it difficult to determine by unauthorized users. As such, it should include some combination of alphanumeric characters and, in some cases, may be case-sensitive. For example, in one embodiment, the unique identification number might be GGC984201aS21BD, where the GGC indicates that Gibson Guitar Corporation owns the unit and the inclusion of various random, case-sensitive alpha-numeric characters makes the identification number difficult to determine by unauthorized users. The information stored in the authorized units database 114 also includes detailed information identifying the location of the authorized units on the Internet, including the Internet Protocol (IP) address and Internet domain for the units.

The music usage database 116 includes information regarding the number of times that a song has been downloaded from the music server 100 to a unit 12. This database includes information identifying the name of each song that is downloaded from the music server 100, the number of times that the downloaded songs are copied to a compact disc (CD) by a unit 12, and the number of times that the downloaded songs are copied to a remote control unit 14. The database can also include usage information on the number of times the music is played back by the recorder/player unit 12 or the remote 14. This information is tracked by the recorder/player unit 12 and is periodically automatically transmitted back to the music server computer system 100.

The recording artist royalty database 118 includes information regarding the recording artists, or the persons or entities, who own the songs stored in the music database 112, including the name and address of the recording artists, and the royalties to be paid for the downloading of any songs stored on the music server 100. The royalty database 118 also includes information identifying where royalties for each artist should be sent. This information may include bank routing and account numbers and may be used to automatically transmit royalty payments to the various artists that have songs on the music server 100.

The TV program guide database 120 includes information regarding programming on cable, satellite, and local television stations. As is well known in the art, this programming may vary from location to location. Accordingly, information regarding various regions in the United States, or other countries for that matter, may be included in the database 120. The information regarding the programming may vary as well, but, in general, it will include the date and time programs will be broadcast, full program descriptions, reviews of various programs, and recommendations regarding various programs.

The music server input/output 108 includes conventional input/output devices and is operable to input and output information from the music server 100. In one embodiment, the music server input/output 108 includes a conventional keyboard, a mouse, and a visual display unit. The input/output 108 may vary from application to application and include other conventional input/output devices.

The music server software 110 is operable to cause the music server 100 to transmit, at predetermined times, streaming audio from the music database 112 to the units 12 using the music server Internet communication system 104. For example, the music server software 110 may be configured to transmit streaming audio daily, weekly, or monthly. The music server software 110 may also be configured to transmit streaming audio continuously as well.

The audio may also be transmitted in a complete file format, rather than as streaming audio.

In addition to the streaming audio, the music server software 110 is operable to cause the music server 100 to transmit program guides describing the streaming audio being broadcast from the music database 112 to the units 12 over the Internet. These program guides include listings of all of the songs being broadcast by the music server software 110, including information regarding the names of songs, the associated artists, the names of CDs containing the songs, and the lengths of the songs. The program guides also include information regarding when the music server software 110 will broadcast certain songs over the Internet, including the date and time when the song will be broadcast. For example, the music program guide may include information regarding all songs that will be broadcast for the week following a particular date.

The music server software 110 is also operable to cause the music server 100 to transmit TV program guides from the TV program guide database 120 to the units 12 over the Internet in conjunction with the streaming audio. These TV program guides include detailed information regarding programming on cable, satellite, and local television stations and includes recommendations, full program descriptions, and reviews.

The music server software 110 is operable to cause the music server 100 to store detailed information regarding music broadcast over the Internet in the music usage database 116. The detailed information may vary, but, in general, will include the number of times a song is downloaded from the music server 100 to a unit 12, the number of times a song is copied from a unit 12 to a compact disc (CD), and the number of times a song is copied from a unit 12 to a remote control unit 14. The detailed information also may include information identifying where a song is downloaded, including the date and time the song is downloaded and the unique identification number of the unit 12 receiving the song.

The music server software 110 is further operable to cause the music server 100 to only transmit music stored in the music database 112 to authorized units 12. The software 110 achieves this function by only sending streaming audio to units 12 that are authorized to receive music broadcasts. To ensure that the music is broadcast only to units 12 authorized to receive the music broadcast, i.e., the owner of the unit 12 has paid the required subscription fee, the music server software 110 obtains a listing of all of the authorized units 12 from the authorized units database 114 and then, using that listing, broadcasts streaming audio to those units 12.

The music server software 110 is operable to cause the music server 100 to prevent unauthorized units and other devices, such as personal computers, from accessing music on the music server 100. If a device other than an authorized unit attempts to access the music server 100, the music server software 110 requests identification information, i.e., a unique identification number, from that device. If the device fails to provide identification information associated with an authorized unit, the music server software 110 denies that device access to the music server 100 and the music database 112.

The music server software 110 can be operated in two different modes. In a first mode, referred to as an Automatic Broadcast mode, the music server software 110 automatically broadcasts music over the Internet to the units 12. In a second mode, referred to as Request Broadcast mode, the music server software 110 only broadcasts music to units 12 that have requested to receive the broadcast. In this mode, the music server software 110 receives a broadcast request from a requesting unit 12. The broadcast request includes information uniquely identifying the requesting unit 12, i.e., the units' unique identification number, and is used by the music server software 110 to determine if the requesting unit 12 is authorized to receive the broadcast. The music server software 110 compares the unique unit identification information received from the requesting unit 12 to the unit identification information stored in the authorized units database 114. If the received information matches, the music server software 110 determines that the requesting unit 12 is authorized and broadcasts the music to the requesting unit 12. If not, the music server software 110 sends a response back to the requesting unit 12 indicating that the unit is not authorized to receive the broadcast.

The music server software 110 is operable to cause the music server 100 to label all songs downloaded to an authorized unit 12 with that unit's unique identification number. In a preferred embodiment, the unique identification number is attached to the song in a manner that prevents it from being removed without damaging the song. As a result, if a user removes the unique identification number the song can no longer be played. By labeling downloaded songs in this manner, the music server 100 is able to track songs downloaded to a particular unit 12. If a song downloaded to a particular unit 12 is improperly placed on another server or computer on the Internet, the label attached to the song can be used to identify the source of the song. The purpose of the labeling is to encourage users not to improperly copy songs without paying the required royalty to the appropriate recording artist. In addition, if a user chooses to improperly copy songs, this labeling system allows the appropriate authorities to identify that user so he can be forced to pay any necessary royalty. Alternatively, the unique identifier could be embedded in the downloaded songs by the recorder/player unit 12 when the music is downloaded or when it is burned onto a CD or otherwise recorded.

Those novel features particularly related to the Internet based music distribution service just described are the subject of Applicant's copending application Ser. No. 11/733,974, filed simultaneously herewith, entitled "Music Distribution System", the details of which are incorporated herein by reference.

Advantages of the Recorder/Player System and the Music Distribution System

The recorder/player units 12 and the music server computer system 100 described above provide an overall system which allows customers to copy all of the music they have collected in a single easy to use location and to be able to play it back virtually anywhere. Customers can record their music CDs to the recorder/player unit with the press of one button. They can save their original CD as a backup or for other use.

Customers can recall and play any song as easily as pressing a number on a jukebox.

Customers can make a CD using any of their library of songs as simply as calling up the songs and pressing "record". The content can be recorded in the original format if it originates from a CD or it can be converted to mp3 format, allowing the customer to make CDs with over 100 songs with nearly the same audio quality providing hours of listening pleasure in the customer's car or other location.

The recorder/player unit is constructed with the attractive appearance of a traditional jukebox, and comes as a single console just like the original jukebox with the same colorful appearance. The recorder/player unit also can easily be converted into three component parts, a beautiful player approximately 18 inches wide which will fit on any audio shelf, and two high fidelity powered speakers which can be placed anywhere in the house. Additionally, the customer can buy additional powered speakers and play back the music from the recorder/player unit in several rooms and locations using the proprietary MaGIC system.

To simplify the customer's use of the recorder/player unit there is nestled in the attractive front panel the full color touch sensitive remote control. The customer can either use the remote control while it is docked (and charging) in the recorder/player unit 12, or slide it out and take it anywhere in the house to control the music experience. This remote uses a computer quality wireless system that is able to penetrate walls and still communicate with the recorder/player unit 12. The remote can display the full information on the customer's songs, CDs or other information. It has all the features of a fully functional personal digital assistant. Using the remote, the customer can record songs from the recorder/player unit 12 to the remote, plug in a high fidelity stereo headset directly into the remote, and hear music anywhere. If the customer wants to listen to music in their home, they can send the music wirelessly directly to the remote without the fuss of recording.

The remote also has an infrared communication system and can control most other audio and video components acting as a true universal remote control. A large database of equipment identifiers is already contained in the recorder/player unit plus it can easily learn from other remotes. The remote can be used as a remote for different rooms with different components, each stored separately. Macros can be programmed into the remote.

The customer's entire remote setup is stored simultaneously on the remote and on the recorder/player unit 12 for easy recall should the remote lose its memory. Lastly, and most impressively, the remote control can be programmed via computer and the customer can trade graphics and remote control features with other users having one of the proprietary recorder/player units 12.

The customer can also purchase a complete home control option which allows the remote control and the recorder/player unit 12 to control lights, appliances and other devices in the home with the inexpensive X-10 remote control system, as well as infrared repeaters which use the wireless system built into the remote control.

The customer can connect the remote control to their home network or to a cable/DSL modem to directly and instantly access updates and service the recorder/player unit 12. If the customer does have access to the Internet in their home, a single connection on the recorder/player unit allows the customer to have the unit access additional free services and subscribe to the Internet based music distribution service.

A complete database of all available CDs comes with the recorder/player unit, and the customer can update this database automatically over the Internet. Service and feature updates are also available. Also, several of the major record labels, and other independent sources allow the customer to access songs and other material such as for emerging artists, absolutely free of charge.

The subscription service described above allows the customer to subscribe to a multi-channel (for example 30 channel) commercial-free digital quality music broadcast which includes music of all genres. The customer can access the program guide with the songs being broadcast via the Internet for a substantial period (such as one week) in advance, which allows the customer as part of their subscription price the ability to copy songs for their own use as part of their library stored on the recorder/player unit.

The subscription service also includes a tv guide for local broadcast either cable, satellite or local stations with recommendations, full program descriptions and reviews. This is downloaded to the customer's recorder/player unit automatically for so long as the customer's subscription is in place, and the guide is instantly available to the customer via their remote control unit 14. Also the customer can obtain additional remote control units and multiple remote control units can be operated at the same time.

As a result, the systems described above allow the consumer to have unparalleled access to and use of recorded music.

Thus, although there have been described particular embodiments of the present invention of a new and useful combination CD recorder and player system, it is not intended that such references be construed as limitations upon the scope of this invention except as set forth in the following claims.

The invention claimed is:

1. A combination compact disc recorder and player system, comprising:
    a combination compact disc recorder and player unit that can be used to play, copy, and store music from compact discs and to create new compact discs using music stored on the combination compact disc recorder and player unit, the combination compact disc recorder and player unit including a recorder/player compact disc drive for playing, copying, and creating compact discs, a recorder/player memory for storing music from compact discs, and a recorder/player communication system;
    a hand held remote control unit that can be used to communicate with and control the combination compact disc recorder and player unit using the recorder/player communication system, the remote control unit being operable to allow a user to locate and play specific compact discs or songs stored on the combination compact disc recorder and player unit and to allow a user to locate and copy specific songs stored on the combination compact disc recorder and player unit to new compact discs, and including a remote control communication system for communicating with the combination compact disc recorder and player unit; and
    wherein the combination compact disc recorder and player unit is operable to transfer music from compact discs inserted in the recorder/player compact disc drive or music stored in the recorder/player memory to the remote control unit and the remote control unit is operable to store and play the transferred music.

2. The system of claim 1, wherein the remote control unit and the remote control unit is operable to play the transferred music without permanently storing the transferred music on the remote control unit.

3. The system of claim 1, wherein the recorder/player communication system includes a wireless communication system.

4. The system of claim 1, wherein the recorder/player communication system includes an 802.11b wireless communication system.

5. The system of claim 1, wherein the recorder/player communication system includes a Bluetooth wireless communication system.

6. The system of claim 1, wherein songs stored on the combination compact disc recorder and player unit can be played a number of times and the combination compact disc recorder and player unit is operable to monitor and store information regarding the number of times songs are played by the combination compact disc recorder and player unit.

7. The system of claim 1, wherein songs stored on the combination compact disc recorder and player unit can be copied to new compact discs or the remote control unit a number of times and the combination compact disc recorder and player unit is operable to monitor and store information regarding the number of times songs stored on the combination compact disc recorder and player unit are copied to new compact discs or the remote control unit.

8. The system of claim 1, wherein the combination compact disc recorder and player unit is operable to prevent songs stored on the combination compact disc recorder and player unit from being copied to any device other than recordable compact discs that have been inserted into the recorder/player compact disc drive or the remote control unit.

9. The system of claim 1, wherein the combination compact disc recorder and player unit includes a unique identification number and the unique identification number is included with each song that is copied to a new compact disc or transmitted to the remote control unit by the combination compact disc recorder and player unit.

10. The system of claim 1, wherein the combination compact disc recorder and player unit is operable to create new compact discs that cannot be copied by a personal computer.

11. The system of claim 1, wherein the combination compact disc recorder and player unit includes a USB interface.

12. The system of claim 1, wherein the combination compact disc recorder and player unit includes a single user interface and the single user interface is the remote control unit.

13. The system of claim 1, wherein the remote control unit includes a personal digital assistant.

14. The system of claim 1, wherein the remote control unit includes a touch screen display that is used to display a series of screens that allow a user to control the combination compact disc recorder and player unit.

15. The system of claim 1, wherein the remote control unit generates a series of screens that allow a user to input commands that cause the combination compact disc recorder and player unit to play music from compact discs inserted in the recorder/player compact disc drive or stored in the recorder/player memory, to copy music from compact discs inserted in the recorder/player compact disc drive to the recorder/player memory, and to copy music stored in the recorder/player memory to new compact discs.

16. The system of claim 1, wherein the remote control unit generates a series of screens that allow a user to input commands that cause the combination compact disc recorder and player unit to copy music from compact discs inserted in the recorder/player compact disc drive or stored in the recorder/player memory to the remote control unit.

17. The system of claim 1, wherein music from a predetermined number of compact discs is stored on the combination compact disc recorder and player unit prior to any use of the system by a user.

18. The system of claim 1, wherein the remote control unit is operable to allow a user to create playlists using music stored on the combination compact disc recorder and player unit.

19. The system of claim 1, wherein the combination compact disc recorder and player unit further includes a recorder/player speaker system for playing music from compact discs inserted in the recorder/player compact disc drive or stored in the recorder/player memory.

* * * * *

UNITED STATES PATENT AND TRADEMARK OFFICE
CERTIFICATE OF CORRECTION

| | | |
|---|---|---|
| PATENT NO. | : 7,249,147 B2 | Page 1 of 1 |
| APPLICATION NO. | : 10/406821 | |
| DATED | : July 24, 2007 | |
| INVENTOR(S) | : Henry E. Juszkiewicz | |

It is certified that error appears in the above-identified patent and that said Letters Patent is hereby corrected as shown below:

Column 5, line 54, replace "MP$^3$" with --MP3--.

Column 7, line 21, replace "802.1b" with --802.11b--.

Column 22, line 33, before "is operable" delete "and the remote control unit".

Signed and Sealed this

Thirteenth Day of November, 2007

JON W. DUDAS
*Director of the United States Patent and Trademark Office*